United States Patent
Sato et al.

(10) Patent No.: US 6,961,177 B2
(45) Date of Patent: Nov. 1, 2005

(54) STEREOSCOPIC IMAGE DISPLAY APPARATUS, DISPLAY APPARATUS, DIVIDED WAVE PLATE FILTER, PLATE-SHARED FILTER, AND FILTER POSITION ADJUSTING MECHANISM ATTACHED TO THE DISPLAY APPARATUS, ALIGNING APPARATUS, FILTER POSITION ADJUSTING METHOD, AND FILTER ALIGNING METHOD

(75) Inventors: Seiji Sato, Kanagawa (JP); Hidehiko Sekizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/343,422

(22) PCT Filed: May 31, 2002

(86) PCT No.: PCT/JP02/05380

§ 371 (c)(1),
(2), (4) Date: Jun. 2, 2003

(87) PCT Pub. No.: WO02/099510

PCT Pub. Date: Dec. 12, 2002

(65) Prior Publication Data

US 2004/0012851 A1 Jan. 22, 2004

(30) Foreign Application Priority Data

Jun. 1, 2001 (JP) ....................... 2001/166706
Aug. 17, 2001 (JP) ....................... 2001/247779
Sep. 4, 2001 (JP) ....................... 2001/267966

(51) Int. Cl.$^7$ .......................... G02B 27/26; G01B 11/00
(52) U.S. Cl. ....................... 359/465; 356/401; 356/399; 356/620
(58) Field of Search ................... 359/462, 465, 359/464, 22; 356/399, 400, 401, 620, 364, 367; 204/461, 467; 250/548

(56) References Cited

U.S. PATENT DOCUMENTS

| 5,113,285 A | * | 5/1992 | Franklin et al. ............ 359/465 |
| 5,543,018 A | * | 8/1996 | Stevens et al. ............ 204/461 |
| 6,426,812 B2 | * | 7/2002 | Ichikawa et al. ............. 359/22 |

FOREIGN PATENT DOCUMENTS

| EP | 0 477 882 A2 | 4/1992 |
| EP | 0 829 743 A2 | 3/1998 |

(Continued)

*Primary Examiner*—Audrey Chang
(74) *Attorney, Agent, or Firm*—Sonnenschein, Nath & Rosenthal LLP

(57) ABSTRACT

A stereoscopic image display apparatus includes: an image display unit 22 for displaying image information corresponding to parallax in a first division and a second division; a divided wave plate filter unit 12 having a frame 41 and disposed adjacent to the first division and the second division of the image display unit, for rotating polarized light of the image information from the first division to a direction different from polarized light of the image information from the second division; and position adjusting means 35R and 35L for acting on the frame of the divided wave plate filter unit and thereby allowing adjustment of a relative position between the image display unit and the divided wave plate filter. Also, a display apparatus includes: a filter unit used in a state of being laid over an image display unit for displaying image information in a first division and a second division; and a filter frame portion disposed integrally around a periphery of the filter unit; wherein the filter unit has a first wave plate in a region corresponding to the first division of the image display unit for rotating polarization direction of the image information from the first division to a direction different from polarization direction of the image information from the second division; and the filter frame portion has an alignment mark formed therein by a second wave plate for rotating polarization direction.

9 Claims, 24 Drawing Sheets

FOREIGN PATENT DOCUMENTS

| | | |
|---|---|---|
| EP | 0 829 744 A2 | 3/1999 |
| JP | 63-220226 | 9/1988 |
| JP | 07-219057 | 8/1995 |
| JP | 09-304739 | 11/1997 |
| JP | 10-232626 | 9/1998 |
| JP | 411015379 A * | 1/1999 ............. G09F/3/02 |
| JP | 2001-75200 | 3/2001 |

* cited by examiner

F I G. 1
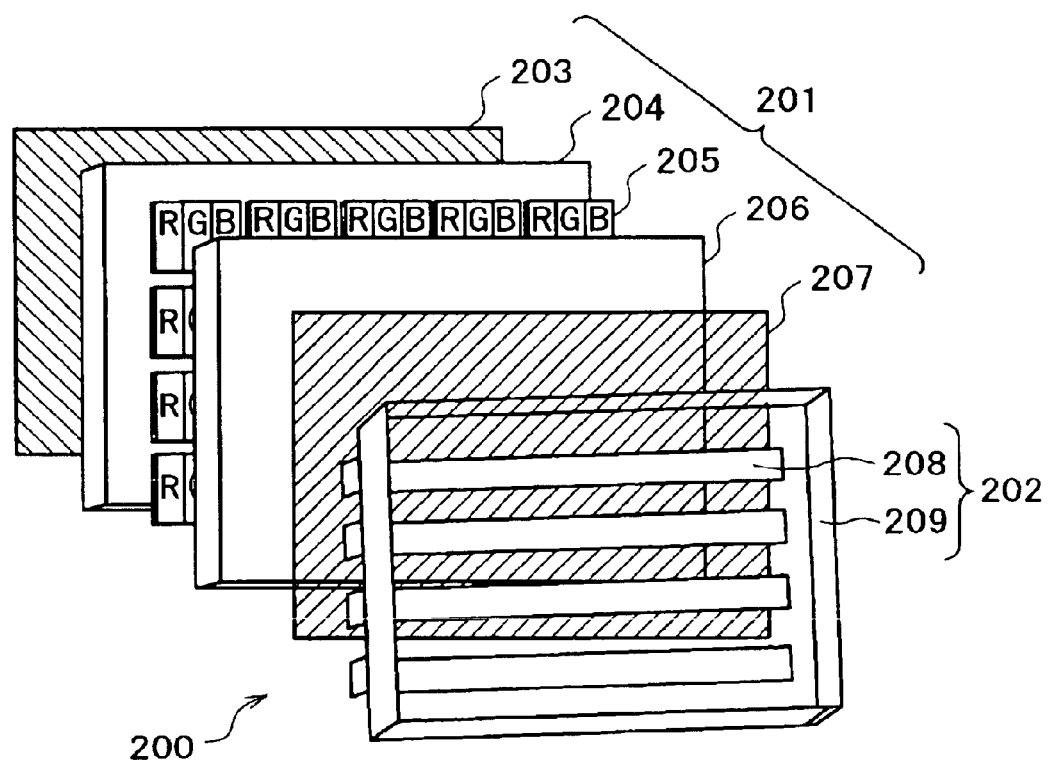
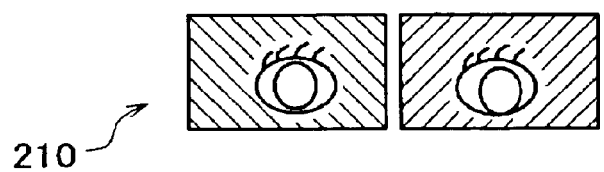

F I G. 2
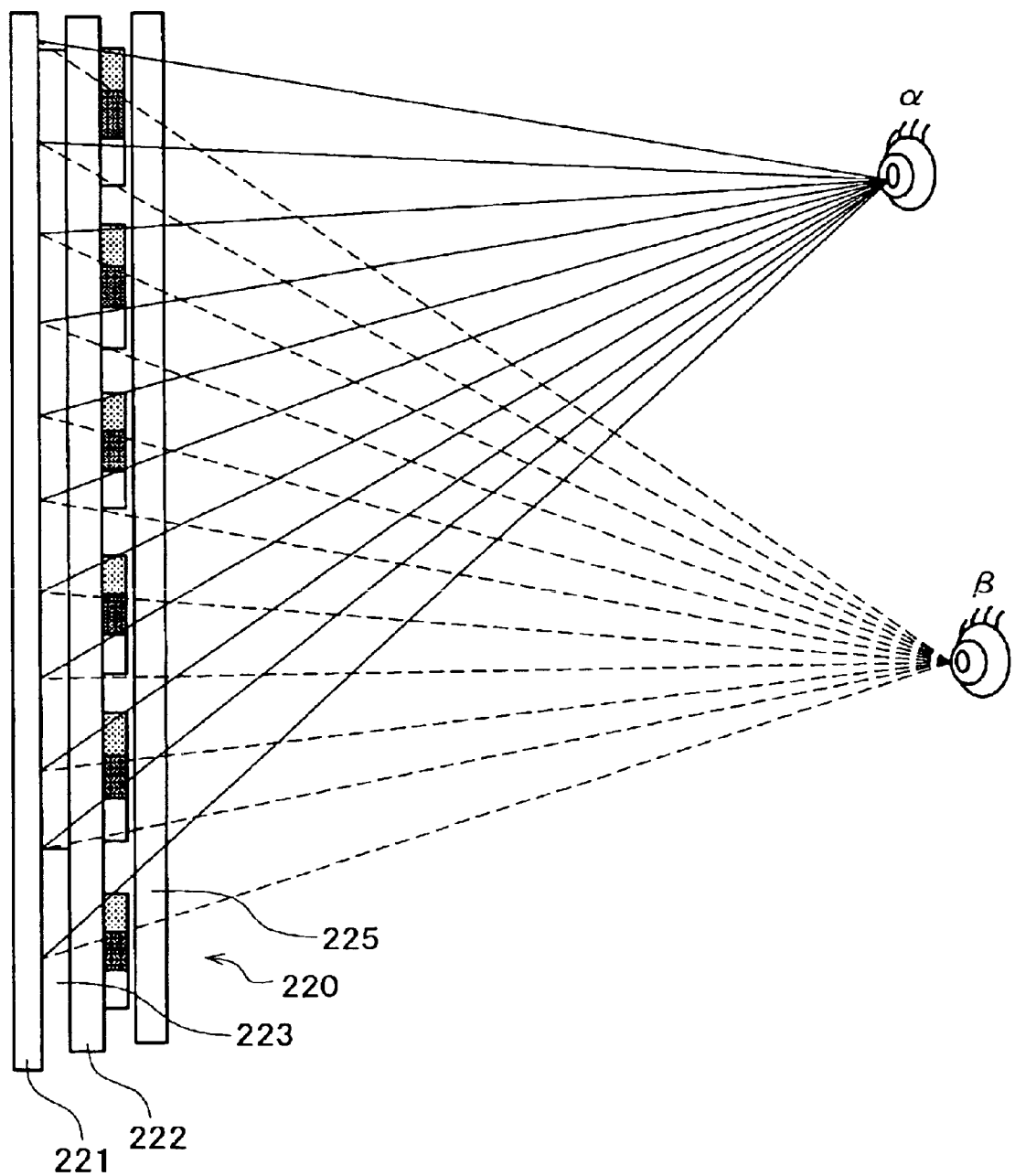

FIG. 20
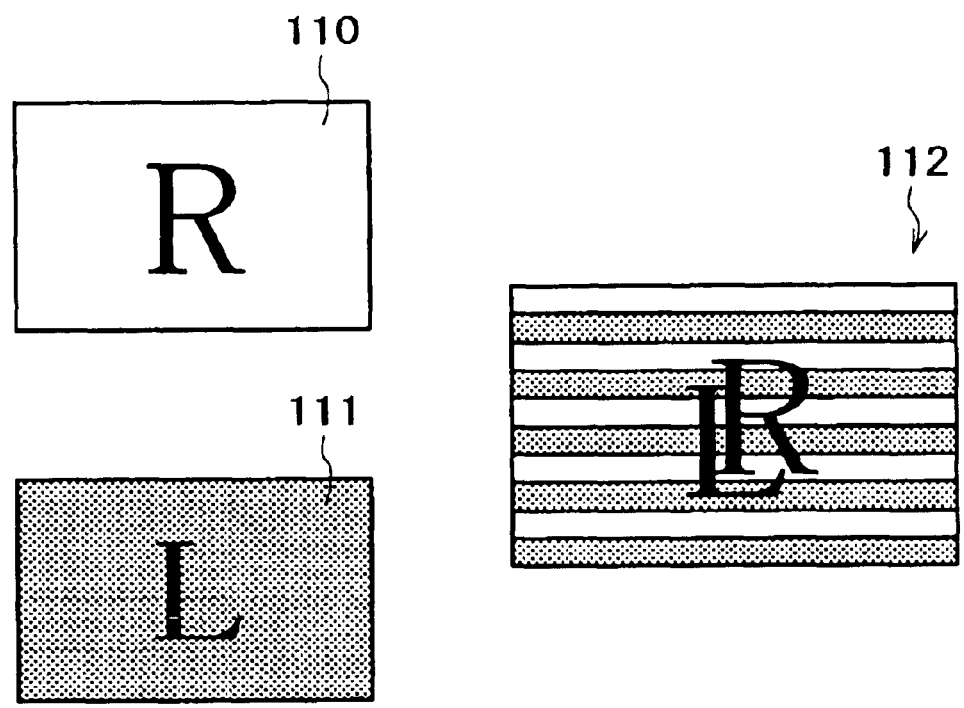
FIG. 21
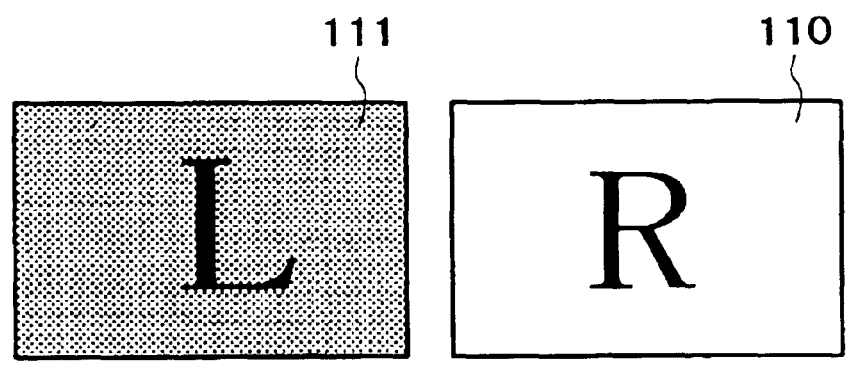
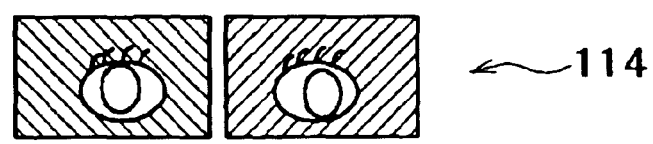

FIG. 28A  FIG. 28C  FIG. 28E
 FIG. 28B   FIG. 28D
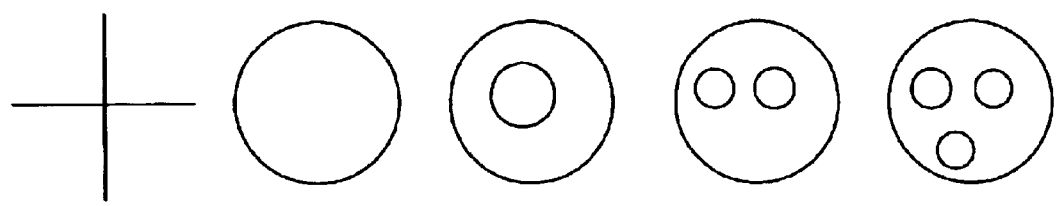
FIG. 29
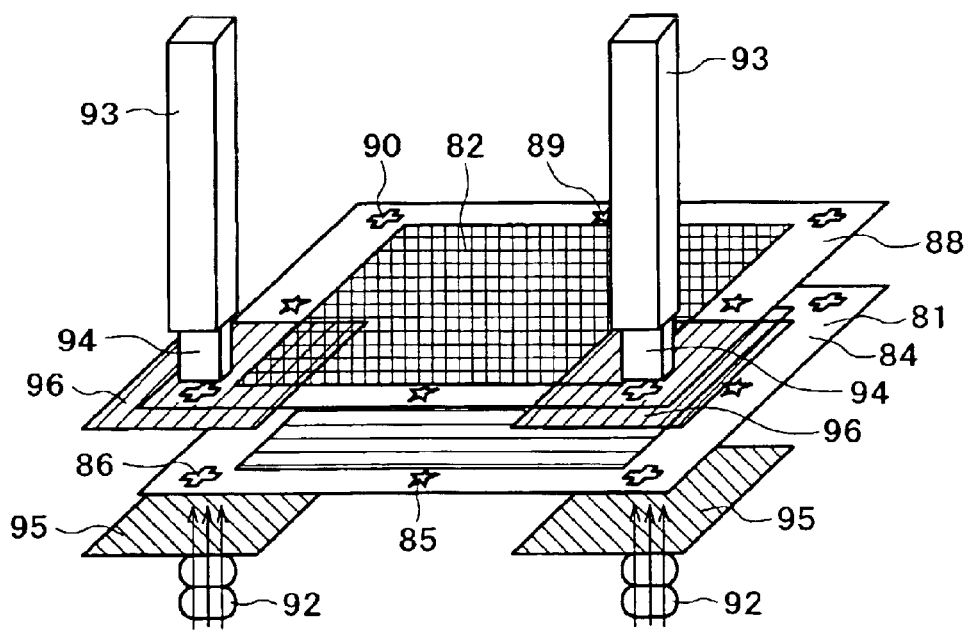

F I G. 3 0
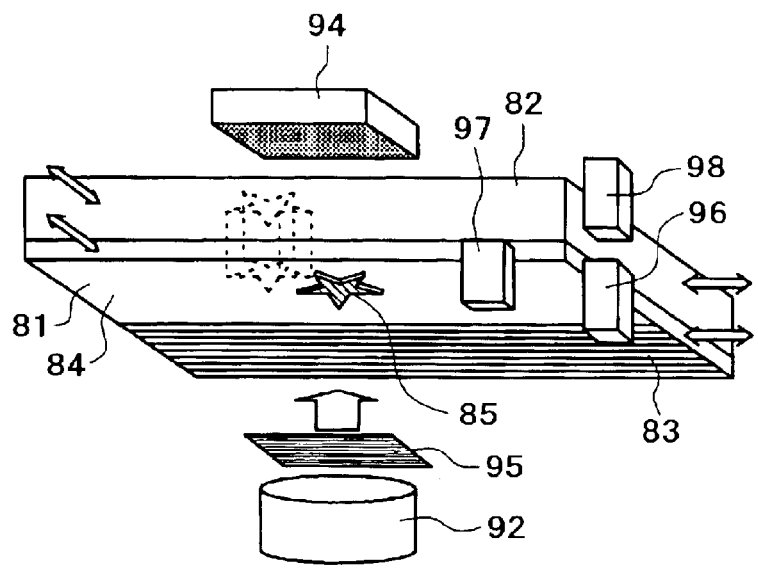
F I G. 3 1
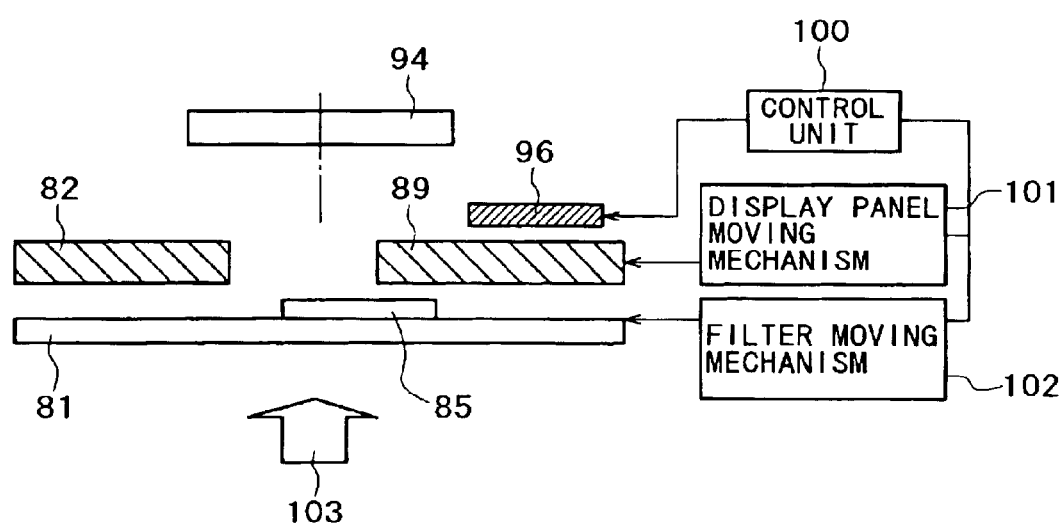

STEREOSCOPIC IMAGE DISPLAY APPARATUS, DISPLAY APPARATUS, DIVIDED WAVE PLATE FILTER, PLATE-SHARED FILTER, AND FILTER POSITION ADJUSTING MECHANISM ATTACHED TO THE DISPLAY APPARATUS, ALIGNING APPARATUS, FILTER POSITION ADJUSTING METHOD, AND FILTER ALIGNING METHOD

BACKGROUND OF THE INVENTION

The present invention relates to a display apparatus that makes it possible to view an image with parallax information, a plate-shaped filter attached to such a display apparatus, a filter position adjusting mechanism, and a filter position adjusting method, and particularly to a filter position adjusting mechanism and a filter position adjusting method for mounting a divided wave plate filter with high precision for display of an optimum stereoscopic image.

Conventionally, various attempts have been made for technology of representing a three-dimensional image, and methods of display of a three-dimensional image have been studied and put to practical use in many fields such as photography, movies, television and the like. Methods of displaying a three-dimensional image are roughly classified into methods of a glasses type and methods of a no-glasses type. Both types of methods input an image with binocular parallax to a right and a left eye of an observer, so that the image can be viewed as a stereoscopic image. Typical glasses type methods include anaglyph methods in which so-called red and blue glasses are worn and polarizing glasses methods. Color separation methods such as the anaglyph methods have many disadvantages in terms of quality, such as difficulty in color representation, degradation in a field of view and the like. The polarizing glasses methods in general had problems such as necessity of using two projectors However, a method of enabling stereoscopic display with a single direct view type display apparatus has recently been proposed.

FIG. 1 schematically shows a stereoscopic image display apparatus using the polarizing glasses method. A stereoscopic image display apparatus 200 has a structure formed by a liquid crystal panel unit 201 and a divided wave plate filter unit 202 attached to the liquid crystal panel unit 201. The liquid crystal panel unit 201 has a pair of transparent supporting substrates 204 and 206 formed between a pair of polarizing plates 203 and 207, and a pixel liquid crystal unit 205 having RGB pixels formed therein which unit is disposed between the pair of transparent supporting substrates 204 and 206. A divided wave plate filter unit 202 is disposed on a surface of the liquid crystal panel unit 201. The divided wave plate filter unit 202 has a structure in which a divided wave plate 208 is disposed in every other line on one side of a transparent protective substrate 209, for example. The divided wave plate filter unit 202 is also referred to as a μ-Pol or micropolarizer.

The stereoscopic image display apparatus 200 of such a structure rotates a direction of linearly polarized light emitted from the liquid crystal panel unit 201, and thereby converts pieces of the linearly polarized light from an even-numbered line and an odd-numbered line of the display screen into pieces of linearly polarized light perpendicular to each other. That is, the linearly polarized light from the liquid crystal panel is emitted as it is from the even-numbered line, and in the odd-numbered line, the divided wave plate 208 acts to convert the linearly polarized light from the liquid crystal panel into linearly polarized light perpendicular to the linearly polarized light from the liquid crystal panel. When the light of the display apparatus is observed by glasses 210 having polarizing directions perpendicular to each other, light of an image for a right eye enters the right eye, and light of an image for a left eye enters the left eye. By looking through the glasses 210, it is possible to observe a full-color, flicker-free stereoscopic image.

In addition, a stereoscopic image display apparatus of the no-glasses type has been devised which uses a wave plate filter as described above effectively to eliminate the need for an observer to wear the glasses (see Japanese Patent Laid-Open No. Hei 10-63199). Furthermore, as an example that uses a wave plate filter as described above effectively, a system that displays two or more mixed pictures on a single display screen potentially having an image separating mechanism and extracts predetermined original images by the image separating mechanism has been devised by the present inventor et al., such as a double-screen display for displaying multiple screens from a single display screen (see Japanese Patent Laid-Open No. Hei 11-249593).

However, when the divided wave plate filter unit 202 is mounted on the display apparatus having the liquid crystal panel unit 201 and the like, the divided wave plate filter unit 202 needs to be securely fixed to a mounting position corresponding to a predetermined region (pixel position) of the display apparatus. This is not easy, and causes the following problems.

A first problem occurs in mounting the divided wave plate filter unit. Since the foregoing display method divides the display screen into predetermined regions and thus uses the display screen, it is effective to make the divided regions as fine as possible in a nested manner for enhanced resolution. While a high-definition panel is available as pixels on a display screen with an increasingly high resolution have become finer, it is extremely difficult to fabricate the corresponding high-definition wave plate filter and fix the divided wave plate filter unit fabricated by the different process with high precision in correspondence with pixels corresponding to the predetermined regions.

Even if the divided wave plate filter unit can be mounted with high precision, the divided wave plate filter unit is generally fixed by a resin or the like, and therefore positional displacement tends to occur during a fixing period before the resin is cured even after the position of the divided wave plate filter unit is adjusted once. In addition, various factors such as vibration during transportation, heat and the like often cause positional displacement. A glass substrate is generally used for the divided wave plate filter unit to maintain precision of the predetermined regions in many cases because of problems in manufacturing, and hence its own weight, in particular, causes positional displacement. In addition, positional displacement of the filter may be caused due to various conditions in durability such as deterioration of the fixing agent and the like. Once the cured resin is displaced, it is extremely difficult to thereafter correct the position, and thus the relatively expensive display panel will be totally wasted.

Furthermore, the stereoscopic image display system has a characteristic in that an optimum disposing position of the filter is determined by a height position of an eye of an observer at the time of viewing. This presents a problem in that a prefixed position is not necessarily the optimum position at the time of observation. FIG. 2 shows such a state. A display apparatus 220 in FIG. 2 is formed by a pixel unit 223 sandwiched between transparent supporting substrates 221 and 222 and a divided wave plate filter unit 225. In the figure, the optimum disposing position of the wave plate filter for an observer at an observation position α is a position of the wave plate filter indicated by solid lines, and similarly the optimum disposing position of the wave plate filter for an observer at an observation position β is a position of the wave plate filter indicated by broken lines in the figure. Thus, as is clear from FIG. 2, the optimum disposing position of the filter is determined by the height position of an eye of an observer at the time of viewing, or even by an angle of the liquid crystal panel and monitor and the like. Hence, this presents a problem in that a position at which the divided wave plate filter unit is prefixed is not necessarily the optimum position at the time of observation of the divided wave plate filter unit.

Further, the factors as described above cause a problem in that displacement of the divided wave plate filter unit by a few to a few ten % of a pixel (a few ten μm in the above example) is observed as a significant cross talk between images. When the divided wave plate filter unit is mounted properly, light from corresponding pixels passes through a corresponding wave plate region at all times, and light from pixels other than the corresponding pixels does not pass through the corresponding wave plate region. However, in a case where the divided wave plate filter unit slants, even when the displacement is only about a few to a few ten % of a pixel, or an absolute amount of displacement is about 50 μm, for example, an amount of displacement in a vertical direction at both edges becomes large, and therefore some of the light from the corresponding pixels may not pass through the corresponding wave plate region. This results in a problem in that cross talk between images occurs and hence a good stereoscopic image cannot be displayed.

Conventionally, in mounting the divided wave plate filter unit, a synthetic image for stereoscopic display similar to an ordinary image is displayed on a screen, and then the position of the divided wave plate filter is determined on the basis of whether the image can be actually viewed as a stereoscopic image with polarizing glasses worn. However, whether the image can be viewed as a stereoscopic image is determined very vaguely; it is therefore desired to be able to position the divided wave plate filter by using a more exact method.

SUMMARY OF THE INVENTION

Accordingly, in view of the technical problems described above, it is an object of the present invention to provide a stereoscopic image display apparatus that realizes reliable display of a stereoscopic image with viewing-field information even when a divided wave plate filter unit is attached thereto, a divided wave plate filter attached to such a display apparatus, a filter position adjusting mechanism, and a filter position adjusting method.

In order to solve the above problems, according to the present invention, there is provided a position adjusting mechanism of a divided wave plate filter, characterized by comprising: a divided wave plate filter unit having a frame attachable to an image display unit for displaying image information corresponding to parallax, for dividing the image information and controlling polarization direction; and position adjusting means for acting on the frame of the divided wave plate filter unit and thereby allowing adjustment of a relative position between the image display unit and the divided wave plate filter.

According to an example of the present invention, the divided wave plate filter unit is divided into lines, the polarization direction is controlled to differ between an even-numbered line and an odd-numbered line, and a dividing direction of the lines of the divided wave plate filter unit is a horizontal direction or a vertical direction. The divided wave plate filter unit is constructed by forming a half-wave plate in every other line.

The divided wave plate filter unit is an area for changing the polarization direction of light from the image display unit in such a manner as to correspond to parallax. The light passed through the divided wave plate filter unit is controlled such that image information for a right eye and image information for a left eye have different polarization directions, preferably directions perpendicular to each other. The divided wave plate filter unit has a frame for forming the wave plate for changing the polarization direction. The position adjusting means acts on the frame and thereby allows adjustment of the relative position between the image display unit and the divided wave plate filter unit.

Also, according to the present invention, there is provided a stereoscopic image display apparatus characterized by comprising: an image display unit for displaying image information corresponding to parallax in a first division and a second division; a divided wave plate filter unit having a frame and disposed adjacent to the first division and the second division of the image display unit, for rotating polarized light of the image information from the first division to a direction different from polarized light of the image information from the second division; and position adjusting means for acting on the frame of the divided wave plate filter unit and thereby allowing adjustment of a relative position between the image display unit and the divided wave plate filter unit.

With the stereoscopic image display apparatus according to the present invention, the divided wave plate filter unit effects control such that the polarized light from the image display unit for displaying the image information corresponding to parallax in the first division and the second division is rotated to directions different for the first division and the second division. The divided wave plate filter unit has a frame for forming a wave plate for changing polarization direction. The position adjusting means acts on the frame and thereby allows adjustment of the relative position between the image display unit and the divided wave plate filter.

Further, according to the present invention, there is provided a filter position adjusting method for a stereoscopic image display apparatus, characterized by comprising the steps of: mounting a divided wave plate filter unit for dividing image information corresponding to parallax and controlling polarization direction on an image display unit for displaying the image information; displaying the image information through the divided wave plate filter unit; and adjusting a relative position between the image display unit and the divided wave plate filter by operating position adjusting means provided to the divided wave plate filter unit for allowing adjustment of the relative position between the image display unit and the divided wave plate filter while viewing the displayed image information.

With the filter position adjusting method according to the present invention, optimizing operation can be performed while observing the image display unit for displaying the image information corresponding to parallax. It is thus possible to save trouble, readily check the relative position between the image display unit and the divided wave plate filter unit in real time, and make separate displays without causing cross talk.

By displaying an adjustment pattern on the display apparatus, it is possible to adjust the position of the filter simply while viewing a stereoscopic image, which has conventionally been impossible. Thus, the position of the filter at the time of actual viewing can be set to an optimum state to view video (image) in its best state. Also in the case of the no-glasses methods and the multiple screen display, video can be viewed in its best state.

Further, in order to solve the above problems, according to the present invention, there is provided a plate-shaped filter characterized by comprising: a filter unit used in a state of being laid over an image display unit for displaying image information in a first division and a second division; and a filter frame portion disposed integrally around a periphery of the filter unit; wherein the filter unit has a first wave plate in a region corresponding to the first division of the image display unit for rotating polarization direction of the image information from the first division to a direction different from polarization direction of the image information from the second division; and the filter frame portion has an alignment mark formed therein by a second wave plate for rotating polarization direction.

With the plate-shaped filter according to the present invention, the filter unit has the first wave plate provided thereon for rotating the polarization direction of the image information from the first division to a direction different from the polarization direction of the image information from the second division. Therefore, control can be effected such that the image information from the different divisions corresponding to the polarization directions is received by both eyes by viewing the display apparatus through polarizing glasses or the like. Thus, display of a stereoscopic image and double-screen display are realized easily. Since the filter frame portion is disposed integrally around the periphery of the filter unit, it is possible to move the filter unit as a whole by moving the filter frame portion. Because the filter frame portion does not directly form the image display unit, provision of the alignment mark does not impair display capability of the image display unit, and allows reliable and high-precision alignment of the filter unit and the image display unit with each other.

Further, according to the present invention, there is provided a display apparatus characterized by comprising: an image display unit for displaying image information in a first division and a second division; an image display frame portion disposed integrally around a periphery of the image display unit; a filter unit used in a state of being laid over the image display unit and having a first wave plate in a region corresponding to the first division of the image display unit for rotating polarization direction of the image information from the first division to a direction different from polarization direction of the image information from the second division; and a filter frame portion disposed integrally around a periphery of the filter unit; wherein the filter frame portion has a first alignment mark formed therein; and the image display frame portion has a second alignment mark formed therein in correspondence with the first alignment mark.

The display apparatus according to the present invention has the foregoing plate-shaped filter, as well as the image display unit and the image display frame portion disposed integrally around the periphery of the image display unit. With a combination of the foregoing plate-shaped filter and the image display unit, display of a stereoscopic image and double-screen display are realized easily. The image display frame portion has the second alignment mark formed therein in correspondence with the first alignment mark formed in the filter frame portion. By using the first and second alignment marks corresponding to each other in combination, it is possible to pick up both the alignment marks simultaneously by the same image pickup means or other position detecting means and thereby align the positions of the plate-shaped filter and the image display unit with each other. Thus, higher-precision alignment is performed at the time of mounting.

According to the present invention, there is provided a filter aligning method for disposing, on an image display unit for displaying image information in a first division and a second division, a plate-shaped filter including a filter unit used in a state of being laid over the image display unit and having a first wave plate in a region corresponding to the first division of the image display unit for rotating polarization direction of the image information from the first division to a direction different from polarization direction of the image information from the second division and a filter frame portion disposed integrally around a periphery of the filter unit, such that the first wave plate corresponds in position to the first division, the filter aligning method characterized by comprising the steps of: detecting a position of the plate-shaped filter using an alignment mark formed in the filter frame portion in a state in which the plate-shaped filter is laid over the image display unit; obtaining a displacement between the position of the plate-shaped filter and a position of the image display unit on the basis of information of the detected position of the plate-shaped filter; and correcting the position of the plate-shaped filter with respect to the image display unit on the basis of an obtained value.

With the filter aligning method according to the present invention, the position of the plate-shaped filter is first detected using the alignment mark formed in the filter frame portion. Since the filter frame portion forms part of the plate-shaped filter, the position of the plate-shaped filter can be grasped by forming the alignment mark in the filter frame portion. In addition, since the alignment mark is formed in the filter frame portion, the alignment mark does not interfere with display of a stereoscopic image. The displacement between the position of the plate-shaped filter and the position of the image display unit is obtained by a method such as calculation or the like on the basis of the information of the detected position of the plate-shaped filter. The position of the plate-shaped filter with respect to the image display unit is corrected on the basis of the obtained value. In this case, the position of the plate-shaped filter is already known, and the position is corrected by moving the plate-shaped filter, the image display unit, or the display panel in a direction that reduces the displacement between the position of the plate-shaped filter and the position of the image display unit.

Further, according to the present invention, there is provided another filter aligning method for disposing, on a display panel including an image display unit for displaying image information in a first division and a second division and an image display frame portion disposed integrally around a periphery of the image display unit, a plate-shaped filter including a filter unit used in a state of being laid over the image display unit and having a first wave plate in a region corresponding to the first division of the image display unit for rotating polarization direction of the image information from the first division to a direction different from polarization direction of the image information from the second division and a filter frame portion disposed integrally around a periphery of the filter unit, such that the first wave plate corresponds in position to the first division, the filter aligning method characterized by comprising the steps of: forming a first alignment mark in the filter frame portion and forming a second alignment mark in the image display frame portion in correspondence with the first alignment mark; detecting a position of the display panel using the second alignment mark formed in the image display frame portion in a state in which the plate-shaped filter is laid over the image display unit; detecting a position of the plate-shaped filter using the first alignment mark formed in the filter frame portion in a state in which the plate-shaped filter is laid over the image display unit; calculating a displacement between the position of the plate-shaped filter and a position of the image display unit on the basis of information of the detected position of the display panel and the detected position of the plate-shaped filter; and correcting the position of the plate-shaped filter with respect to the image display unit on the basis of a calculated value.

In the filter aligning method according to the present invention, the first alignment mark is formed in the filter frame portion and the second alignment mark is formed in the image display frame portion in correspondence with the first alignment mark. It is therefore possible to detect both the position of the image display frame portion, that is, the display panel and the position of the filter frame portion, that is, the plate-shaped filter individually, and to thus align the plate-shaped filter with higher precision.

According to the present invention, in order to realize the filter aligning method as described above, there is provided a filter aligning apparatus characterized by comprising: filter supporting means for movably supporting, over an image display unit for displaying image information in a first division and a second division, a plate-shaped filter including a filter unit used in a state of being laid over the image display unit and having a first wave plate in a region corresponding to the first division of the image display unit for rotating polarization direction of the image information from the first division to a direction different from polarization direction of the image information from the second division and a filter frame portion disposed integrally around a periphery of the filter unit, in a state in which the plate-shaped filter is laid over the image display unit; filter position detecting means for detecting a position of the plate-shaped filter using an alignment mark formed in the filter frame portion; and control means for obtaining a displacement between the position of the plate-shaped filter and a position of the image display unit on the basis of information of the detected position of the plate-shaped filter, and operating the filter supporting means so as to correct the position of the plate-shaped filter with respect to the image display unit on the basis of an obtained value.

With the filter aligning apparatus according to the present invention, the filter position detecting means for detecting the position of the plate-shaped filter detects the position of the plate-shaped filter using the alignment mark formed in the filter frame portion. In this state, the plate-shaped filter is supported by the filter supporting means, and the supporting means can be controlled by a signal from the control means on the basis of the information of the detected position. It is therefore possible to adjust the positions of the plate-shaped filter and the display panel reliably.

Further, according to the present invention, there is provided another filter aligning apparatus characterized by comprising: display panel supporting means for movably supporting a display panel including an image display unit for displaying image information in a first division and a second division and an image display frame portion disposed integrally around a periphery of the image display unit and having a second alignment mark formed therein; filter supporting means for movably supporting a plate-shaped filter including a filter unit used in a state of being laid over the image display unit and having a first wave plate in a region corresponding to the first division of the image display unit for rotating polarization direction of the image information from the first division to a direction different from polarization direction of the image information from the second division and a filter frame portion disposed integrally around a periphery of the filter unit and having a first alignment mark formed therein, in a state in which the plate-shaped filter is laid over the image display unit; display panel position detecting means for detecting a position of the display panel using the second alignment mark formed in the image display frame portion in a state in which the plate-shaped filter is laid over the image display unit; filter position detecting means for detecting a position of the plate-shaped filter using the first alignment mark formed in the filter frame portion in a state in which the plate-shaped filter is laid over the image display unit; and control means for obtaining a displacement between the position of the plate-shaped filter and a position of the image display unit on the basis of information of the detected position of the display panel and the detected position of the plate-shaped filter, and operating at least one of the filter supporting means and the display panel supporting means so as to correct a relative position of the plate-shaped filter with respect to the image display unit on the basis of an obtained value.

With the filter aligning apparatus, the filter position detecting means for detecting the position of the plate-shaped filter detects the position of the plate-shaped filter using the alignment mark formed in the filter frame portion, and the display panel position detecting means detects the position of the display panel using the second alignment mark formed in the image display frame portion. In this state, the plate-shaped filter and the display panel are supported by their respective supporting means, and the supporting means can be each controlled by a signal from the control means on the basis of the information of the detected position. It is therefore possible to adjust the positions of the plate-shaped filter and the display panel reliably.

BRIEF DESCRIPTION OF DRAWINGS

FIG. 1 is a schematic exploded view of a structure of a pixel unit and a divided wave plate filter unit of a related-art stereoscopic image display apparatus.

FIG. 2 is a sectional view of a structure of a divided wave plate filter unit of a related-art stereoscopic image display apparatus.

FIG. 20 is a diagram showing an example of an adjustment pattern to be displayed at the time of adjustment of the stereoscopic image display apparatus according to the first embodiment of the present invention.

FIG. 21 is a diagram showing an example of an adjustment pattern to be displayed at the time of adjustment of the stereoscopic image display apparatus according to the first embodiment of the present invention, and is a diagram showing a state of a screen as viewed by a user after proper adjustment.

FIG. 28 are plan views of other examples of alignment marks formed in the liquid crystal panel unit and the divided wave plate filter of the stereoscopic image display apparatus according to the second embodiment of the present invention.

FIG. 29 is a schematic perspective view of an aligning apparatus used at the time of mounting the display apparatus according to the second embodiment of the present invention.

FIG. 30 is a perspective view of main parts of the aligning apparatus in FIG. 29.

FIG. 31 is a sectional view of assistance in explaining steps in aligning, for mounting, the liquid crystal panel unit and the divided wave plate filter of the display apparatus according to the second embodiment of the present invention, and is a sectional view of assistance in explaining a step of detecting a position of the liquid crystal panel unit.

DETAILED DESCRIPTION OF THE PRESENTLY PREFERRED EMBODIMENTS

Preferred embodiments of the present invention will hereinafter be described with reference to the drawings. It is to be noted that while in the embodiments, stereoscopic image display apparatus for displaying image information with parallax will be described mainly, double-screen display is possible by a similar configuration, and a display apparatus of a double-screen display type can be similarly configured.

Figure 3:
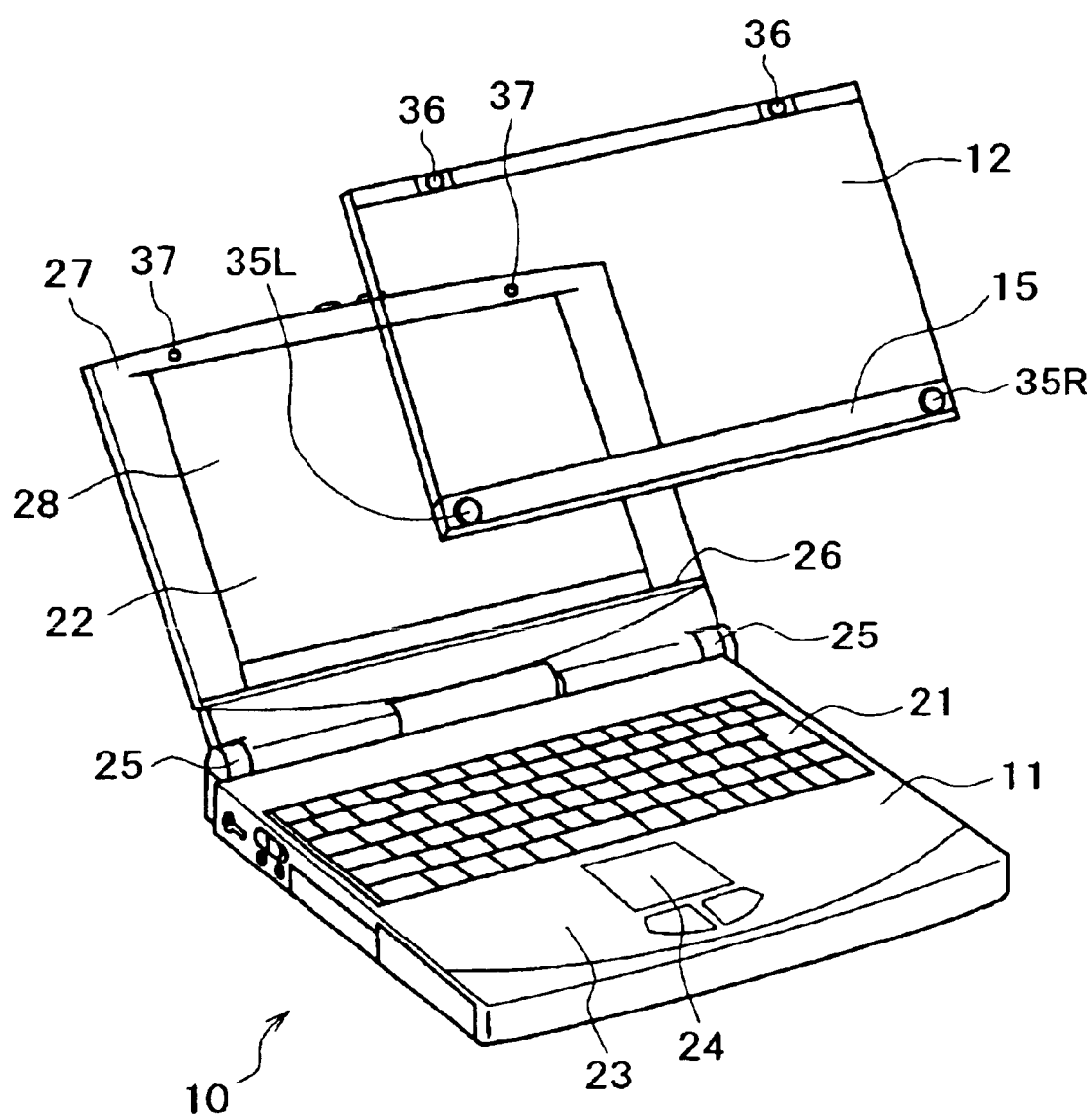
FIG. 3 is a perspective view of a stereoscopic image display apparatus according to a first embodiment of the present invention.

FIG. 3 schematically shows a configuration of a stereoscopic image display apparatus 10 according to a first embodiment of the present invention. The stereoscopic image display apparatus 10 according to the first embodiment includes a notebook computer 11; a divided wave plate filter unit 12 as a plate-shaped filter attachable to the notebook computer 11; and a pair of a right and a left adjusting screw 35R and 35L as position adjusting means integrally attached to the divided wave plate filter unit 12.

The notebook computer 11 includes a liquid crystal panel unit 22 of a folding structure having a liquid crystal display unit 28, which serves as an image display unit. An image including parallax can be displayed from the liquid crystal panel unit 22. As later described, the liquid crystal panel unit 22 itself may be a liquid crystal display unit of a normal notebook computer 11. When an application for displaying a stereoscopic image is not opened, the liquid crystal panel unit 22 can display ordinary images (moving images and still images), for example.

A keyboard unit 21 including keys corresponding to alphanumeric characters, hiragana, and katakana, as well as various control keys is formed on a side of the notebook computer 11 which side is opposed to the liquid crystal panel unit 22. A palm rest unit 23 is provided on a side nearer to a user in a manner continuous with the keyboard unit 21. A pointer pad unit 24 is formed on substantially a central portion of the palm rest unit 23. The keyboard unit 21 and the like are connected to the liquid crystal panel unit 22 via hinge parts 25 and 25, and the liquid crystal panel unit 22 is rotatable on the hinge parts 25 and 25. Thus, a viewer of a stereoscopic image can control an angle of the liquid crystal panel unit 22 with the hinge parts 25 and 25 as a center of rotation. A program for displaying a position adjusting pattern is stored within a hard disk of the notebook computer 11. The program is read into a CPU and then executed, whereby a position adjusting pattern is displayed on the liquid crystal panel unit 22.

The liquid crystal panel unit 22 has around the periphery thereof a supporting frame 27 of a synthetic resin for holding the image display portion. The liquid crystal display unit 28 of the liquid crystal panel unit 22 is formed in a state of being held by the supporting frame 27. A projecting portion 26 is provided by forming a part of the supporting frame 27 into a projection on a side under the liquid crystal display unit 28. In order to hold a bottom portion of the divided wave plate filter unit 12, the projecting portion 26 is projecting to an extent that the projecting portion 26 does not become an obstacle when the liquid crystal panel unit 22 is folded and the projecting portion 26 can fully engage and stop the bottom portion of the divided wave plate filter unit 12.

As later described, the divided wave plate filter unit 12 is a polarized light control unit provided with a half-wave plate of a band shape for every other horizontal line of pixels. The divided wave plate filter unit 12 is provided in particular with a horizontal holding member 15 of a metal or a synthetic resin with a required stiffness at the bottom portion of the divided wave plate filter unit 12, and a left adjusting knob 35L and a right adjusting knob 35R forming part of the position adjusting means at portions near both ends of the horizontal holding member 15, respectively. A pair of mounting screws 36 and 36 is provided on an upper edge side of the divided wave plate filter unit 12. At the time of mounting the divided wave plate filter unit 12, the mounting screws 36 and 36 are screwed into screw holes 37 formed in the supporting frame 27 of the liquid crystal panel unit 22 via holes not shown in the figure provided at the upper edge portion of the divided wave plate filter unit 12.

The stereoscopic image display apparatus 10 according to the first embodiment has the position adjusting means such as the left adjusting knob 35L and the right adjusting knob 35R and the like. As described above, it is thereby possible to control rotation of the divided wave plate filter unit 12 including fine control of a position of the divided wave plate filter unit 12 in a direction perpendicular to a horizontal direction, that is, a direction in which each divided wave plate of the band shape of the divided wave plate filter unit 12 extends. Thus, optimum stereoscopic display is realized.

Figure 4A:
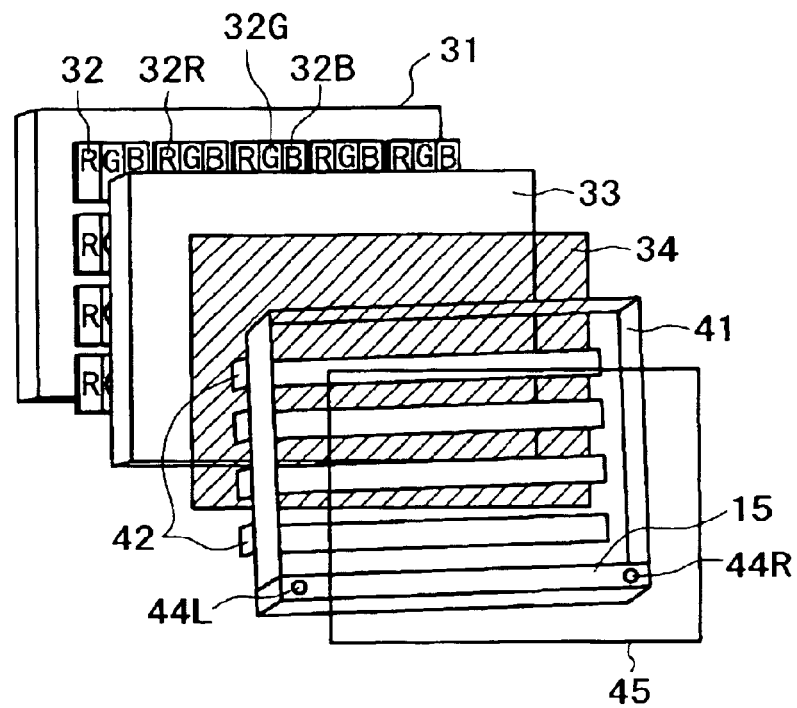
FIG. 4 are schematic exploded views of a structure of a pixel unit and a divided wave plate filter unit of the stereoscopic image display apparatus according to the first embodiment of the present invention.

FIG. 4A is an exploded perspective view of assistance in explaining a display structure of the stereoscopic image display apparatus according to the first embodiment. A structure of the liquid crystal panel and a structure of the divided wave plate filter unit are combined with each other to enable stereoscopic display. First, the liquid crystal panel has a structure in which liquid crystal pixel units 32 are disposed between a pair of transparent supporting substrates 31 and 33. The liquid crystal pixel units 32 are each formed by a combination of a red pixel unit 32R, a green pixel unit 32G, and a blue pixel unit 32B. The pixel portions each formed of the three colors are arranged in a matrix manner. The pixel units 32 are provided with necessary electric wiring to form a passive matrix structure, an active matrix structure or the like. When displaying a stereoscopic image, the pixel units 32 display image information corresponding to parallax. It is to be noted that while in the first embodiment, description is made of an example using a liquid crystal panel as an image display unit, the image display unit of a stereoscopic image display apparatus according to the present invention can be formed by various image display devices such as a light emitting element array display device, an organic electroluminescence display device, a cathode-ray tube, a plasma display device and the like, and that the divided wave plate filter unit can be operated in combination with these various image display devices.

A polarizing plate 34 is disposed on a viewer side of the transparent supporting substrate 33. Light after passing through the polarizing plate 34 becomes a linear polarization, and the linearly polarized light reaches the divided wave plate filter unit. The divided wave plate filter unit has divided wave plates 42 each in a band shape formed on one side of a transparent supporting substrate 41 made of glass or the like and serving as a frame, or on the liquid crystal panel side in this example. The divided wave plates 42 are each extended such that a longitudinal direction of the divided wave plates 42 is a horizontal direction. The band shape of each of the divided wave plates 42 has a width substantially equal to a pixel pitch of the liquid crystal pixel units 32 mentioned above. A number of divided wave plates 42 is half a number of pixels in a vertical direction of the liquid crystal pixel units 32.

The divided wave plates 42 each in the band shape are formed one for every other line at the pixel pitch of the liquid crystal pixel units 32. Hence, either one of a image for a left eye passes through the divided wave plates 42, whereby a direction of polarization of the stereoscopic image is rotated by 90 degrees. The stereoscopic image that does not pass through the divided wave plates 42 is emitted as it is without a direction of polarization thereof being rotated. It is to be noted that while in the first embodiment, the divided wave plates 42 are extended one for every other line in the horizontal direction, divided wave plates 42 may be formed one for each line such that the direction of polarization differs between a stereoscopic image for a right eye and a stereoscopic image for a left eye. Also, the direction in which the divided wave plates 42 are extended is not limited to the horizontal direction; the direction may be a vertical direction or an oblique direction. Furthermore, a divided wave plate 42 may be provided for each area rather than for each line (Faris U.S. Pat. No. 5,327,285, for example). While in the first embodiment, the divided wave plates 42 are formed on a surface on the liquid crystal panel side of the transparent supporting substrate 41, the divided wave plates 42 can be formed on the viewer side.

A horizontal holding member 15 is attached to the bottom portion of the transparent supporting substrate 41 serving as a frame. Screw holes 44L and 44R to which position adjusting means such as a left adjusting knob 35L and a right adjusting knob 35R and the like as later described is attached are formed at a part of both end portions of the horizontal holding member 15. The adjusting mechanism will be described later.

Figure 4B:
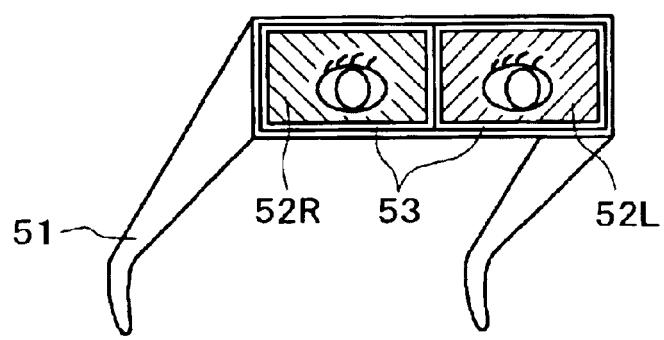

For stereoscopic display, light is controlled to a direction of polarization that differs between lines, and at a point in time when the light has passed through the divided wave plates 42, two kinds of linearly polarized light perpendicular to each other occur in a mixed state. A viewer wears polarizing glasses 51 as shown in FIG. 4B to selectively receive a stereoscopic image for a right eye and a stereoscopic image for a left eye by both the eyes. Lens parts 52R and 52L of the glasses are each a polarizing filter, and therefore when a polarizing angle of the polarizing filter does not coincide with an angle of the linear polarization, it becomes difficult to view the stereoscopic image. Thus, in the first embodiment, a quarter-wave plate 45 is further formed on an outside portion of the divided wave plate filter unit to convert the linearly polarized light into circularly polarized light. A quarter-wave plate 53 is also attached to a surface of the polarizing glasses 51, whereby the circularly polarized light is again converted into linearly polarized light to pass through the polarizing glasses 51. The pair of quarter-wave plates 45 and 53 allows a stereoscopic image to be viewed reliably even when the direction of polarization is somewhat changed.

Figure 5:
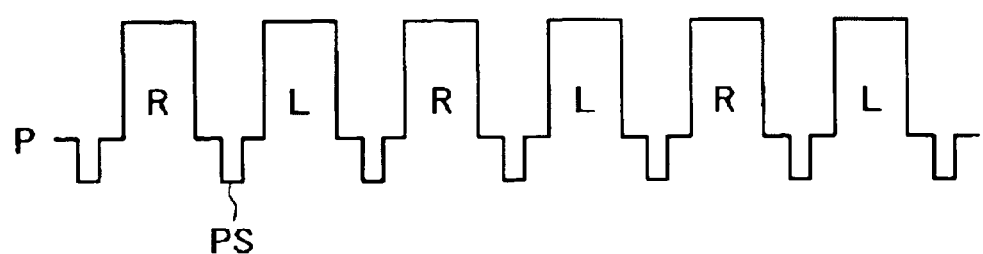
FIG. 5 is a waveform chart of an example of an image signal used by the stereoscopic image display apparatus according to the first embodiment of the present invention.
Figure 6:
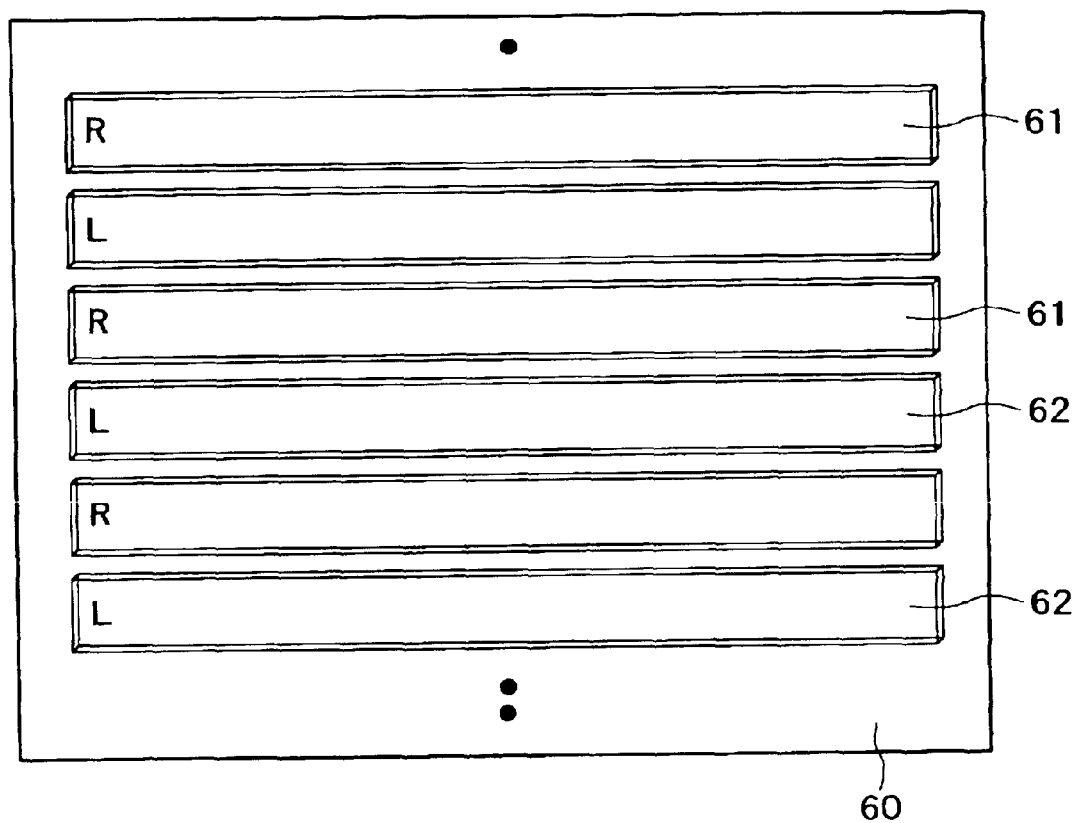
FIG. 6 is a schematic diagram showing an image pattern of the stereoscopic image display apparatus according to the first embodiment of the present invention.

Referring to FIG. 5 and FIG. 6, image information in the stereoscopic image display apparatus according to the first embodiment will next be described in brief. An image signal P as shown in FIG. 5 is used in the stereoscopic image display apparatus according to the first embodiment. Specifically, in horizontal scanning periods divided by pulses of a vertical synchronizing signal PS, image data R for a right eye and image data L for a left eye are alternately sent to each line.

FIG. 6 shows divisions of image data displayed on an image display unit 60. As described above, first divisions 61 for the right eye and second divisions 62 for the left eye are arranged alternately for each line in accordance with the image data R for the right eye and the image data L for the left eye alternately sent to each line as shown in FIG. 5. Thus, when a certain pixel line of the liquid crystal panel displays the image data R for the right eye, a next pixel line displays the image division 61 for the right eye and the second division 62 for the left eye are repeated alternately for each line to display a stereoscopic image as a whole.

Figure 7:
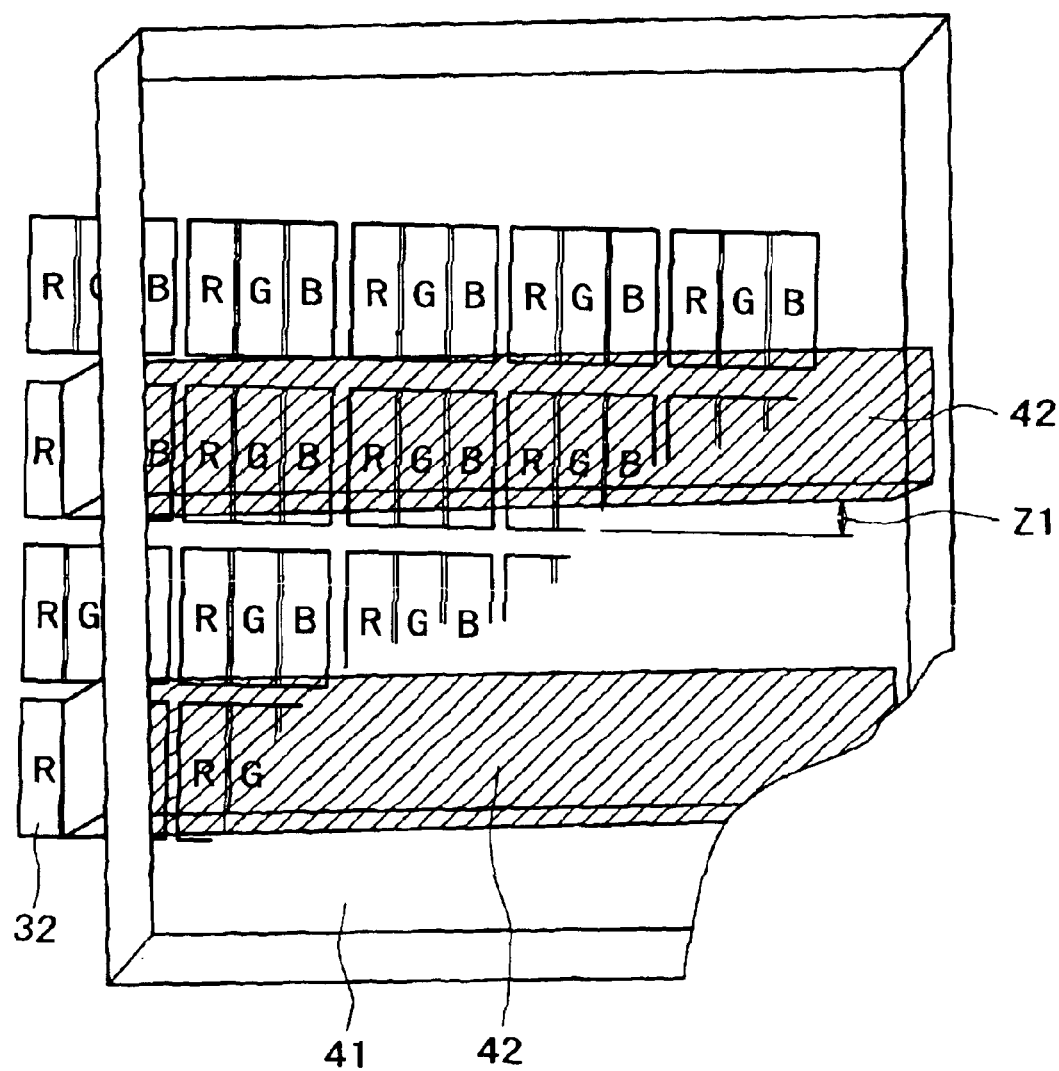
FIG. 7 is a perspective view of the stereoscopic image display apparatus according to the first embodiment of the present invention in a state before position adjustment.

By mounting the divided wave plate filter unit on an ordinary liquid crystal panel or the like, it is possible to readily view a stereoscopic image. However, incorrect adjustment of positional relation between pixel units of the display apparatus and the divided wave plate filter unit typically results in a relation between pixel units 32 of the display apparatus and divided wave plates 42 as shown in FIG. 7. Even when the divided wave plate filter unit having the divided wave plates 42 formed thereon slants slightly, in a case where an amount of displacement Z1 in a vertical direction is a few to a few ten % of a pixel, or an absolute amount of displacement is about 50 $\mu$m for a pixel of 250 $\mu$m, for example, some of light from the originally corresponding pixels does not pass through the predetermined divided wave plates 42. As a result, cross talk between images may occur.

Figure 8:
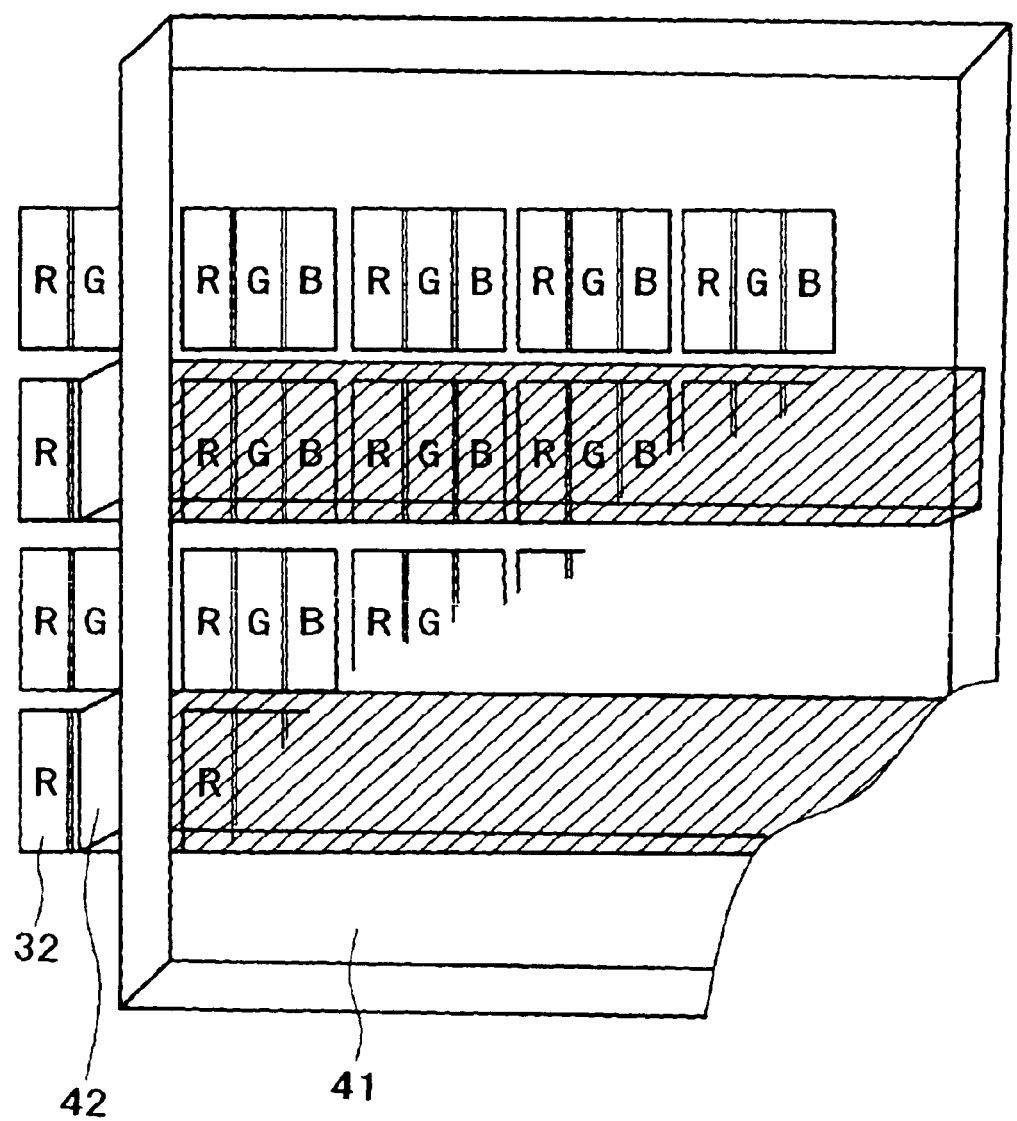
FIG. 8 is a perspective view of the stereoscopic image display apparatus according to the first embodiment of the present invention in a state after the position adjustment.

Suppression of such cross talk is necessary for display of an optimum stereoscopic image, and a position adjusting operation is required for this purpose. FIG. 8 shows the divided wave plates 42 adjusted to a correct position by the position adjusting operation. As shown in FIG. 8, a divided wave plate 42 formed in the band shape is disposed so as to lie exactly on a pixel line of a pixel unit 32 of the display apparatus. Light from pixel units 32 corresponding to the divided wave plates 42 passes through the divisions of the corresponding divided wave plates 42 without fail, and light from pixels of other than the corresponding pixel units does not pass through the regions within the divided wave plates 42. Thus, a good stereoscopic image is displayed without occurrence of cross talk.

The position adjusting operation will be described in the following with reference to FIGS. 9 to 13. An apparatus structure for realizing the operation will be described in detail after description of the position adjusting operation. As described above, in the stereoscopic image display apparatus according to the first embodiment, the divided wave plate filter unit 12 is formed on the surface of the liquid crystal panel unit 22, the horizontal holding member 15 is provided at the bottom portion of the divided wave plate filter unit 12, and the left adjusting knob 35L and the right adjusting knob 35R are attached as the position adjusting means to the two end portions of the horizontal holding member 15.

Figure 9:
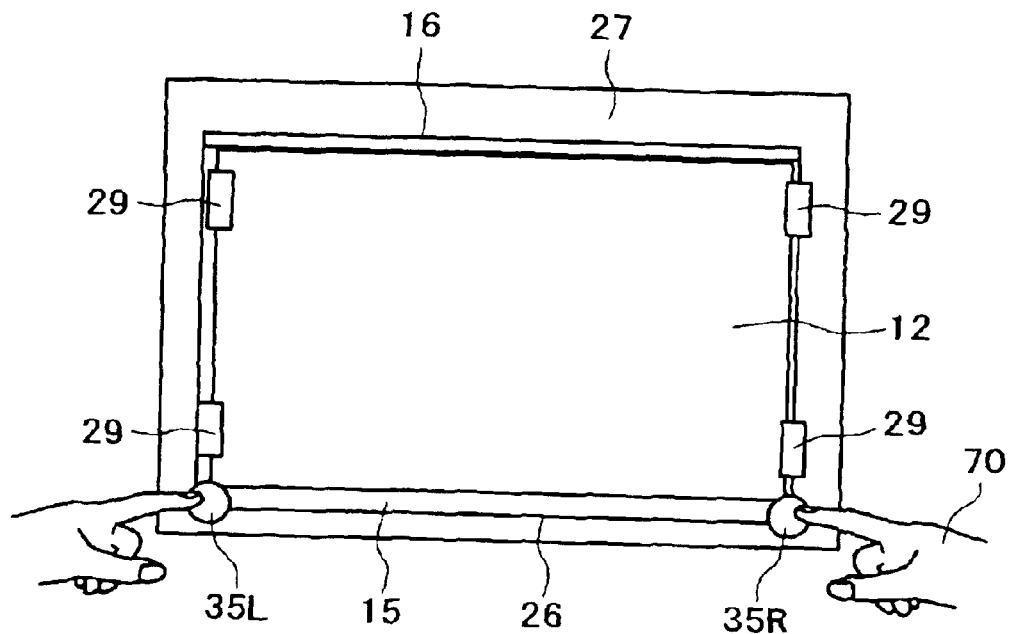
FIG. 9 is a schematic diagram of assistance in explaining fine adjustment of the position of the divided wave plate filter unit of the stereoscopic image display apparatus according to the first embodiment of the present invention.

As shown in FIG. 9, by operating the left adjusting knob 35L and the right adjusting knob 35R shown in enlarged dimension by a finger 70, for example, it is possible to readily and surely adjust the height position of each of the filter wave plates while viewing a state of the display screen, which has conventionally been impossible. By rotating a peripheral portion of each of the adjusting knobs 35L and 35R with a fingertip, it is possible to finely adjust the position of the divided wave plate filter unit 12 in a direction of the height of the divided wave plate filter unit 12, or a vertical direction. Specifically, when both the left adjusting knob 35L and the right adjusting knob 35R are operated at the same time in the same manner, since the left adjusting knob 35L and the right adjusting knob 35R are of substantially the same structure, the position of the divided wave plate filter unit 12 can be finely adjusted in the direction of the height of the divided wave plate filter unit 12, or the vertical direction. When one of the left adjusting knob 35L and the right adjusting knob 35R is operated, only the side where the operation is performed is finely adjusted in the vertical direction, which means that the divided wave plate filter unit 12 is adjusted in position while rotated relatively to the image display unit.

In the fine position adjustment, as later described, a display pattern for adjustment is displayed, for example. By using the display pattern for adjustment, it is possible to make the adjustment while viewing the display pattern. Thus, the stereoscopic image display apparatus according to the first embodiment allows the position of the divided wave plate filter unit 12 to be reliably optimized, allows real-time checking of the position, and makes separate displays without causing cross talk.

Figure 12:
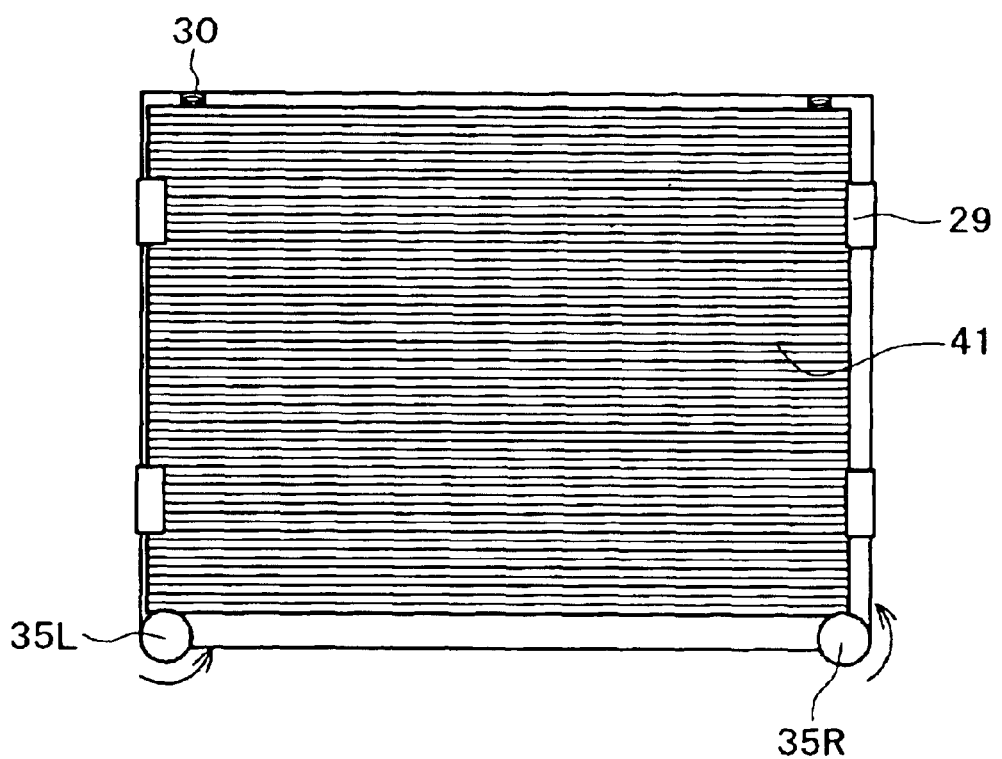
FIG. 12 is a schematic diagram of assistance in explaining fine adjustment of the position of the divided wave plate filter unit of the stereoscopic image display apparatus according to the first embodiment of the present invention, and is a schematic diagram of a state at the time of rotation adjustment.
Figure 13:
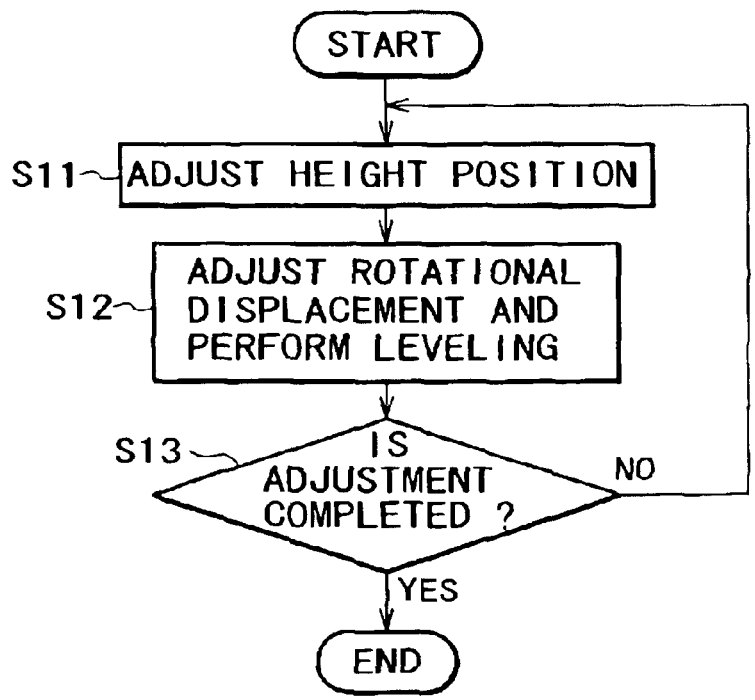
FIG. 13 is a flowchart of operation for fine adjustment of the position of the divided wave plate filter unit of the stereoscopic image display apparatus according to the first embodiment of the present invention.

A typical adjusting operation will be described in the following with reference to schematic diagrams of FIGS. 10 to 12 and a flowchart of FIG. 13. It is to be noted that this adjusting method is a mere example, and the position of the divided wave plate filter unit of the stereoscopic image display apparatus according to the first embodiment can be adjusted by other operating methods.

Figure 10:
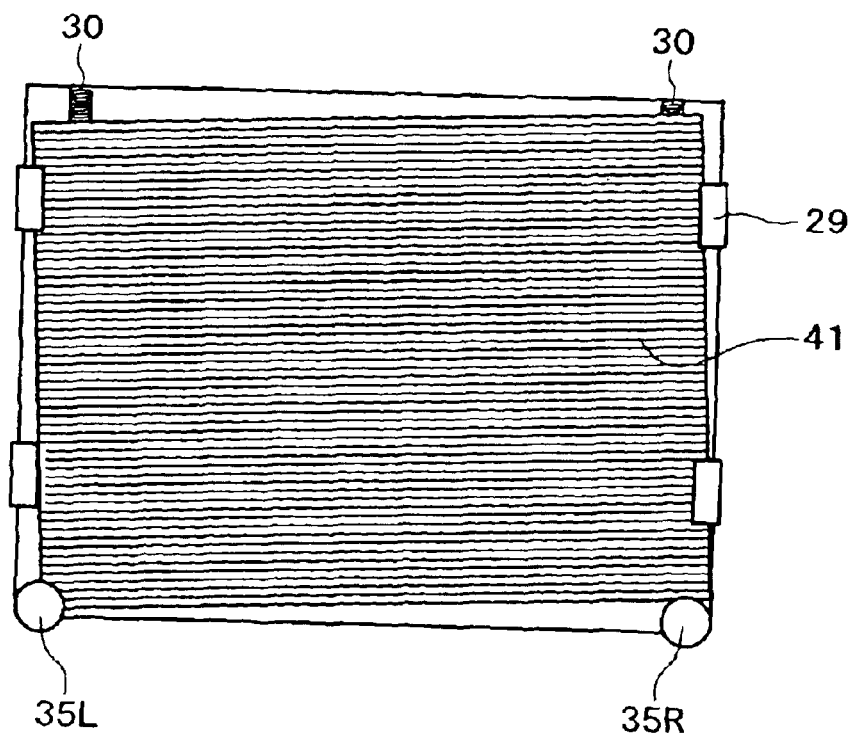
FIG. 10 is a schematic diagram of assistance in explaining fine adjustment of the position of the divided wave plate filter unit of the stereoscopic image display apparatus according to the first embodiment of the present invention, and is a schematic diagram of a displaced state.

First, suppose that the transparent supporting substrate 41 serving as the frame of the divided wave plate filter unit is mounted on the projecting portion of the liquid crystal panel unit, and in a state shown in FIG. 10, for example, the transparent supporting substrate 41 is somewhat slanting downward to the left side and upward to the right side in the figure. Since the pixel pitch is 200 to 300 $\mu$m, for example, even a slight displacement may make it impossible to obtain a good image of the display pattern for adjustment on display.

Figure 11:
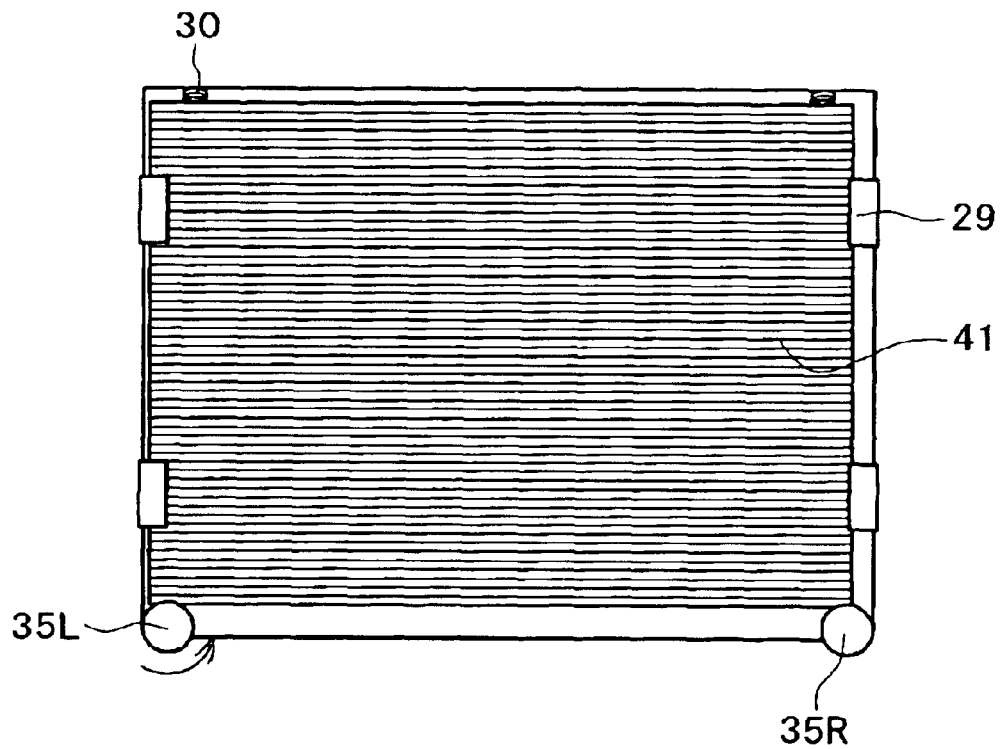
FIG. 11 is a schematic diagram of assistance in explaining fine adjustment of the position of the divided wave plate filter unit of the stereoscopic image display apparatus according to the first embodiment of the present invention, and is a schematic diagram of a state at the time of height position adjustment.

In a state of such a positional displacement, the left adjusting knob 35L on the left side to which the transparent supporting substrate 41 is somewhat slanting downward is operated as shown in FIG. 11 to adjust the height of the transparent supporting substrate 41 so that the transparent supporting substrate 41 is supported substantially horizontally (step S11). Although as a result of such height adjustment, the divided wave plate filter unit comes to substantially correspond to the pixel units of the liquid crystal panel, a slight positional displacement remains in practice because of an error in product dimensions of the panel, expansion due to the temperature and the like. Hence, as shown in FIG. 12, by operating both the left adjusting knob 35L and the right adjusting knob 35R, for example in directions opposite to each other, adjustment of rotational displacement and leveling of the transparent supporting substrate 41 are performed to correct positional displacement (step S12).

Positional displacement between the divided wave plate filter unit and the image display unit is ultimately determined while monitoring the display pattern for adjustment (step S13). The display pattern for adjustment being displayed is observed through polarizing glasses. When there is no problem, it is determined that the adjustment is completed, and thereby the adjustment is ended. When observation of the display pattern for adjustment shows that a pattern such as a moire pattern is still displayed, the adjustment is insufficient, and thus the steps S11 and S12 are repeated to proceed with the adjustment.

Figure 14:
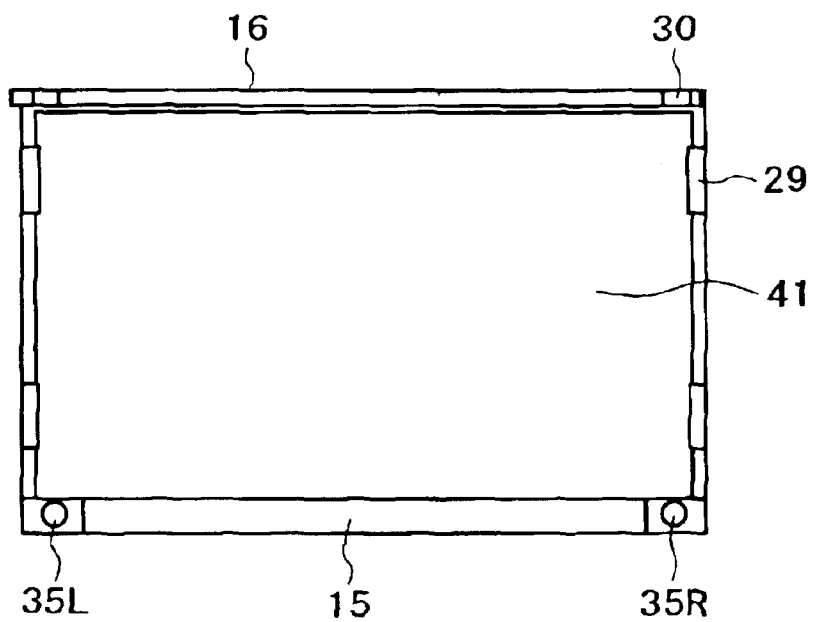
FIG. 14 is a front view of a structure of the divided wave plate filter unit of the stereoscopic image display apparatus according to the first embodiment of the present invention.
Figure 15:
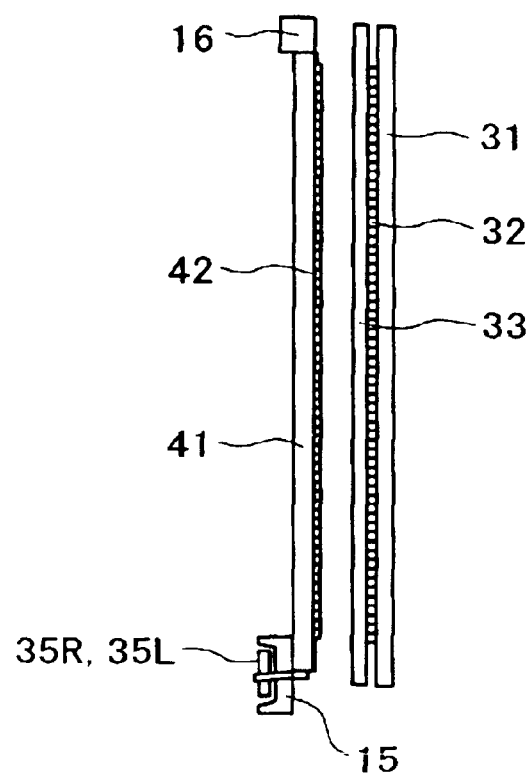
FIG. 15 is a sectional view of the structure of the divided wave plate filter unit of the stereoscopic image display apparatus according to the first embodiment of the present invention.
Figure 16:
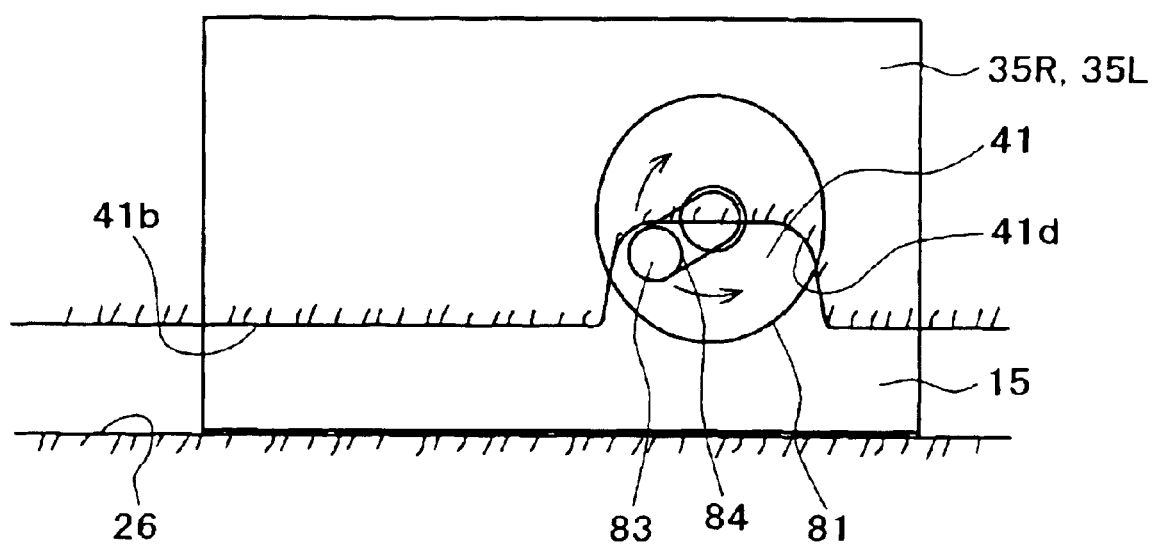
FIG. 16 is a rear view of A adjusting knob and its peripheral portion of the divided wave plate filter unit of the stereoscopic image display apparatus according to the first embodiment of the present invention.
Figure 17:
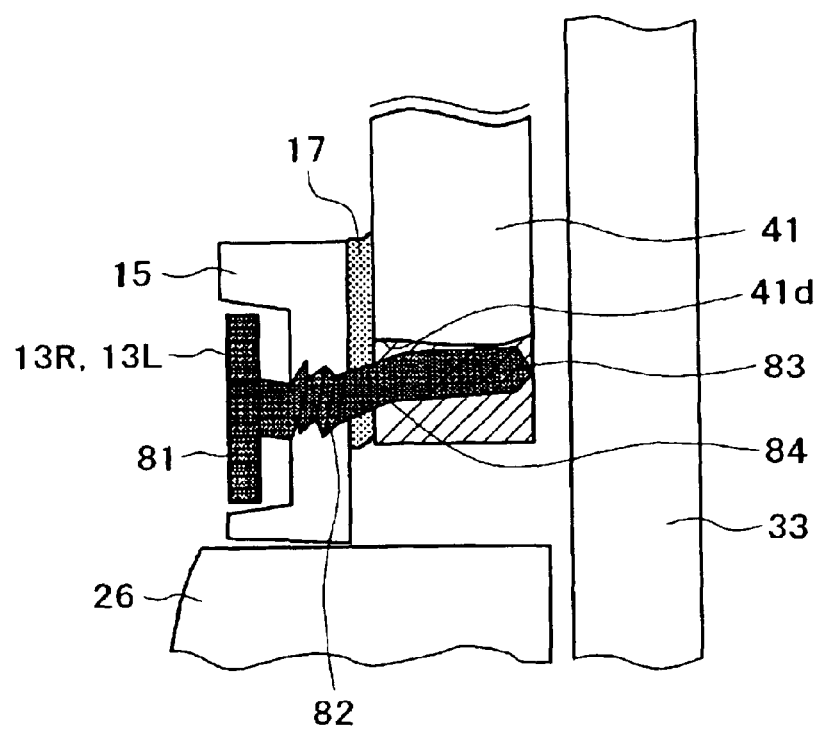
FIG. 17 is a sectional view of the adjusting knob and its peripheral portion of the divided wave plate filter unit of the stereoscopic image display apparatus according to the first embodiment of the present invention.

FIGS. 14 to 17 are diagrams showing the left adjusting knob 35L and the right adjusting knob 35R as the position adjusting means and a peripheral mechanism thereof. As shown in FIG. 14, the horizontal holding member 15 is attached to the lower edge of the transparent supporting substrate 41 serving as a frame, and the horizontal holding member 15 is formed of a material with a relatively high stiffness such as a metal, resin or the like. The horizontal holding member 15 is formed throughout the lower edge of the transparent supporting substrate 41. As shown in FIG. 15, the horizontal holding member 15 is of substantially a U-shape in section, for example. As shown in FIG. 17, the horizontal holding member 15 is attached to the lower edge of the transparent supporting substrate 41 via a semi-fixing resin agent 17. The intermediate semi-fixing resin agent 17 prevents the horizontal holding member 15 from being completely separated from the transparent supporting substrate 41, and even when the position of the transparent supporting substrate 41 is finely adjusted by operating the left adjusting knob 35L and the right adjusting knob 35R, the semi-fixing resin agent 17 connects the transparent supporting substrate 41 and the horizontal holding member 15 to each other while accommodating the adjustment.

An upper edge member 16 is mounted on an upper edge of the transparent supporting substrate 41, and a pair of a right and a left spring 30 as an elastic member is disposed within the upper edge member 16. The spring 30 has an upper end in contact with the inside of the upper edge member 16, and a lower end in contact with an upper side surface of the transparent supporting substrate 41. Such springs 30 are formed to allow fine adjustment by the left adjusting knob 35L and the right adjusting knob 35R and facilitate adjustment in the height direction perpendicular to the direction in which the divided wave plate filter extends. The upper edge member 16 also functions to fix the position after the adjustment and prevent positional displacement due to play. Further, as part of the adjusting means, a guide 29 can be provided on the supporting frame 27, as shown in FIG. 14. The guide 29 functions as regulating means for regulating the position in a dividing direction of the lines of the divided wave plate filter unit. Thus, by fitting the transparent supporting substrate 41 to the guide 29 and thus mounting the transparent supporting substrate 41, control can be effected so as to prevent displacement in the dividing direction of the divided wave plate filter unit when the wave plate filter of the stereoscopic image display apparatus is moved for adjustment, and therefore the adjustment can be facilitated.

The left adjusting knob 35L and the right adjusting knob 35R as the position adjusting means have a structure using a so-called eccentric screw. FIG. 16 is a rear view of the left adjusting knob 35L or the right adjusting knob 35R and a peripheral portion thereof. FIG. 17 is a sectional view of the left adjusting knob 35L or the right adjusting knob 35R and the peripheral portion thereof.

As shown in FIG. 16 and FIG. 17, the adjusting knobs 35L and 35R as a position adjusting mechanism are provided at the lower edge portion of the transparent supporting substrate 41. A screw shaft 82 is formed off the center of rotation of the adjusting knobs 35L and 35R so as to be screwed into a screw hole formed so as to penetrate the horizontal holding member 15. An end portion 83 of the screw shaft 82 is in contact with a side portion of a lower edge notch portion 41d of the transparent supporting substrate 41, the side portion having a thickness of the substrate. Rotational movement of the adjusting knobs 35L and 35R raises the lower edge notch portion 41d of the transparent supporting substrate 41 and lowers the transparent supporting substrate 41 while in contact with the lower edge notch portion 41d of the transparent supporting substrate 41 by gravity or the like. A rotation of the adjusting knobs 35L and 35R in a clockwise direction in FIG. 16 can raise the lower edge notch portion 41d of the transparent supporting substrate 41 and a rotation of the adjusting knobs 35L and 35R in a counterclockwise direction in FIG. 16 can lower the lower edge notch portion 41d of the transparent supporting substrate 41. As shown in FIG. 17, the lower edge notch portion 41d forms the shape of an indentation in the edge surface of transparent supporting substrate 41 to allow smooth rotational operation of the adjusting knobs 35L and 35R. The rotational operation of the adjusting knobs 35L and 35R can be readily performed by operating a disk portion 81 having non-slip indentations formed around the periphery thereof. While the screw shaft 82 is bent at a bent portion 84, the screw shaft 82 may be formed by a crank-shaped screw shaft or the like. Also, the center for rotation of the disk portion 81 is not limited to the screw hole formed so as to penetrate the horizontal holding member 15, and modifications in which other members are used as the center of rotation are possible.

Figure 18:
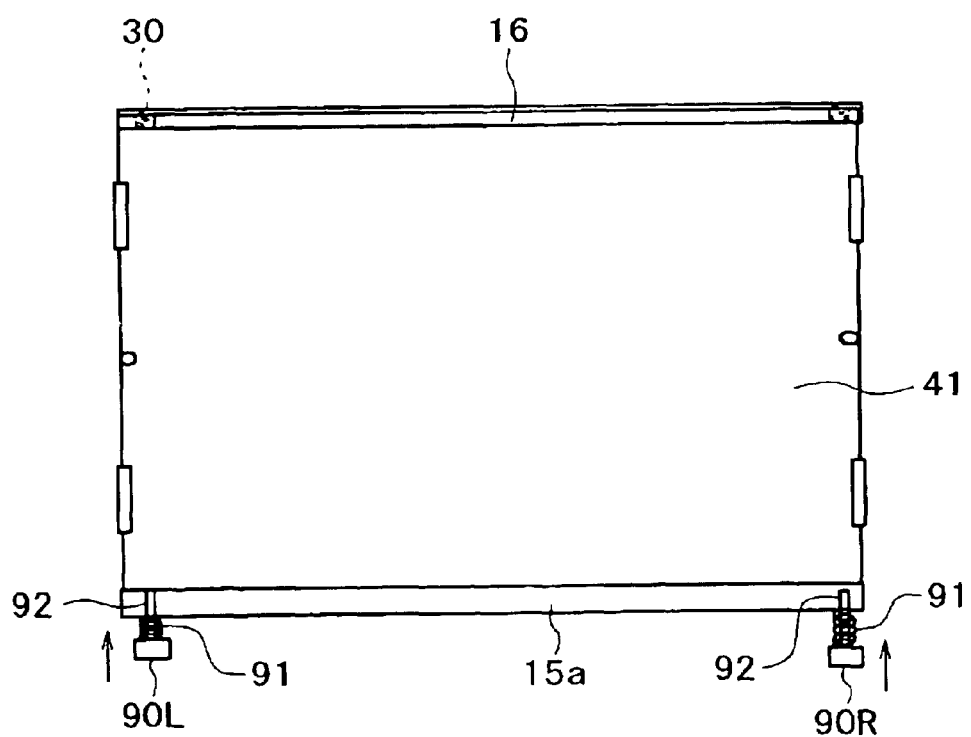
FIG. 18 is a front view of another structure of the divided wave plate filter unit of the stereoscopic image display apparatus according to the first embodiment of the present invention.
Figure 19:
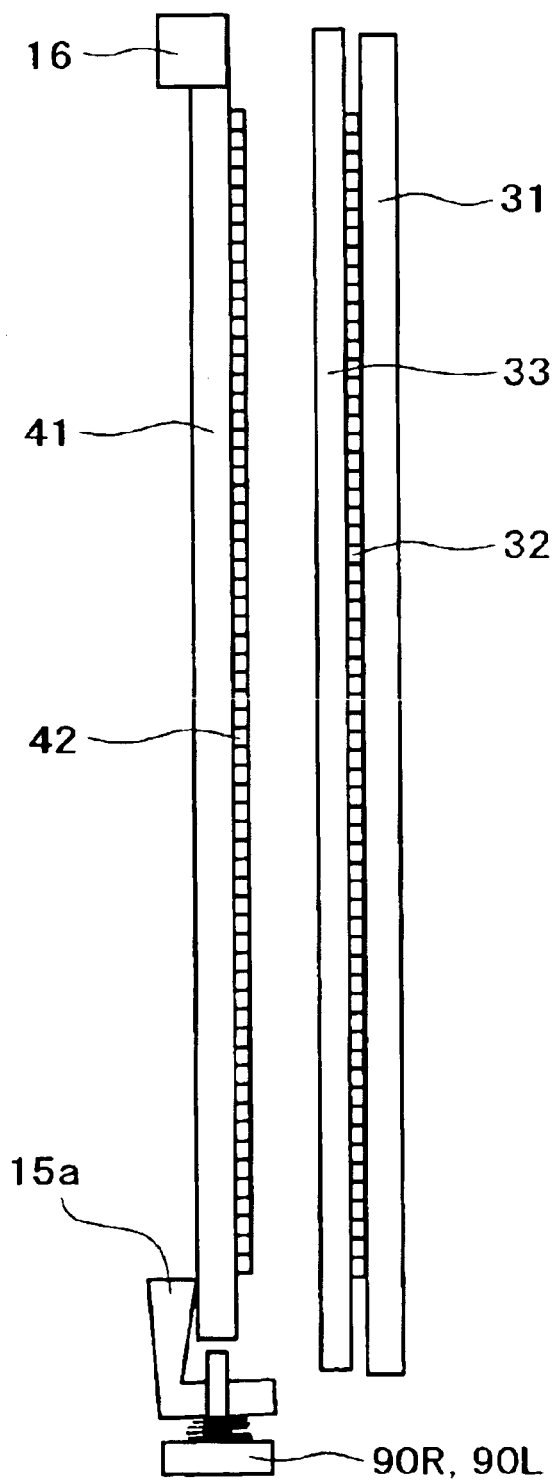
FIG. 19 is a sectional view of the other structure of the divided wave plate filter unit of the stereoscopic image display apparatus according to the first embodiment of the present invention.

A modification of the position adjusting means will be described with reference to FIG. 18 and FIG. 19. In this modification, a horizontal holding member 15a is formed throughout the lower edge portion of a transparent supporting substrate 41, and further adjusting knobs 90L and 90R are attached so as to project from a bottom surface side of the horizontal holding member 15a toward an under side of the horizontal holding member 15a. The adjusting knobs 90L and 90R are screwed into a screw hole that penetrates a bottom portion of the horizontal holding member 15a in a substantially vertical direction via a spring 91, and end portions 92 on the upper side of the adjusting knobs 90L and 90R are thus in contact with the bottom portion of the horizontal holding member 15a to allow fine adjustment of the transparent supporting substrate 41 in the vertical direction.

Moving the end portions 92 upward by rotating the adjusting knobs 90L and 90R adds an upward force to the transparent supporting substrate 41 connected by a semi-fixing resin, and thus moves the transparent supporting substrate 41 in an upward direction for adjustment. Similarly, rotating the adjusting knobs 90L and 90R in the opposite direction moves the end portions 92 in a downward direction, and therefore the transparent supporting substrate 41 is moved in a downward direction for adjustment. The position of the transparent supporting substrate 41 can also be adjusted reliably by the adjusting knobs 90L and 90R of such a structure.

FIGS. 20 to 23 are diagrams of assistance in explaining adjustment patterns to be displayed on the display apparatus at the time of adjustment. FIG. 20 shows an example of an adjustment pattern to be displayed on the display apparatus at the time of adjustment. The pattern displayed on the display apparatus such as an adjustment pattern 112 has a letter of a black R and a letter of a black L superimposed on each other, and has a red background 110 of the letter R and a green background 111 of the letter L displayed alternately for each line. The red background 110 of the letter R is an image for a right eye, and the green background 111 of the letter L is an image for a left eye.

If the adjustment pattern 112 is viewed without polarizing glasses, the adjustment pattern 112 displayed as it is can be viewed. In a case where the divided wave plate filter unit is in the correct position, when wearing polarizing glasses 114, the left eye sees the green background 111 of the letter L and the right eye sees the red background 110 of the letter R, as shown in FIG. 21.

However, in a case where the position of the divided wave plate filter unit is displaced, a part of the image for the right eye passes through a part of a divided wave plate (see FIG. 7, for example), and therefore polarization direction is rotated. Thus, the part of the image for the right eye passes through a lens for the left eye of the polarizing glasses and is consequently seen by the left eye. Furthermore, a part of the image for the left eye does not pass through a divided wave plate, so that the polarization direction is not rotated, then passes through a lens for the right eye of the polarizing glasses, and is consequently seen by the right eye. Thus, when the divided wave plate filter unit is slanted, the two background colors 111 and 110 are seen by both the right eye and the left eye.

When the position of the divided wave plate filter unit is displaced in the vertical direction, the image for the right eye that is not intended to pass through the divided wave plates passes through the divided wave plates, and at the same time, the image for the left eye that is intended to pass through the divided wave plates does not pass through the divided wave plates, for example. As a result, the image for the right eye passes through the opposite lens for the left eye and is then seen by the left eye, and the image for the left eye passes through the opposite lens for the right eye and is then seen by the right eye.

Hence, occurrence of a state of mixed colors and the right and left images being seen by the opposite eyes as described above directly indicate a displacement of the position of the divided wave plate filter unit. By rectifying such a positional displacement by means of the adjusting knobs 35L, 35R, 90L, and 90R described above, the divided wave plate filter unit can be readily adjusted to the correct position.

Figure 22:
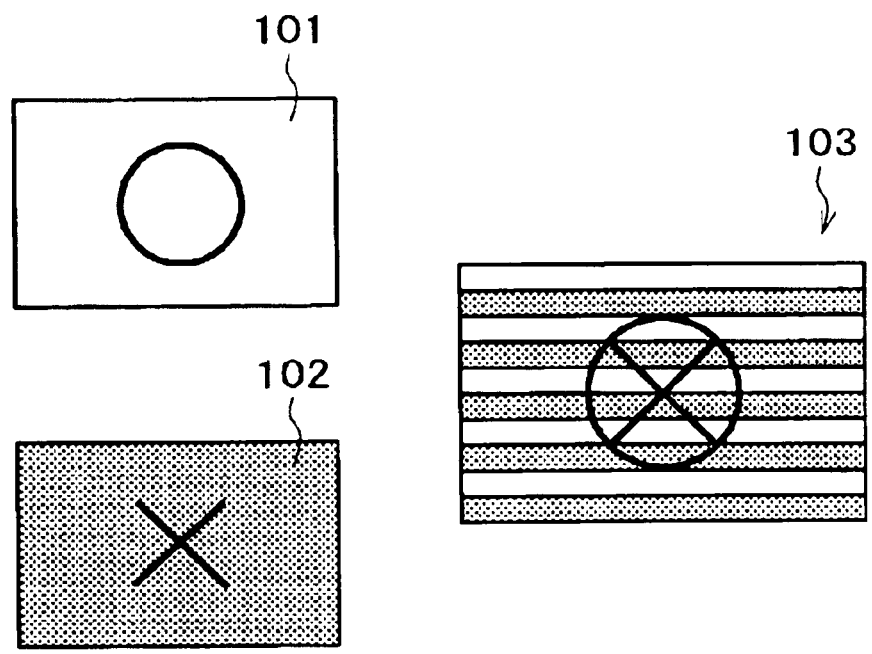
FIG. 22 is a diagram showing another example of an adjustment pattern to be displayed at the time of adjustment of the stereoscopic image display apparatus according to the first embodiment of the present invention.
Figure 23:
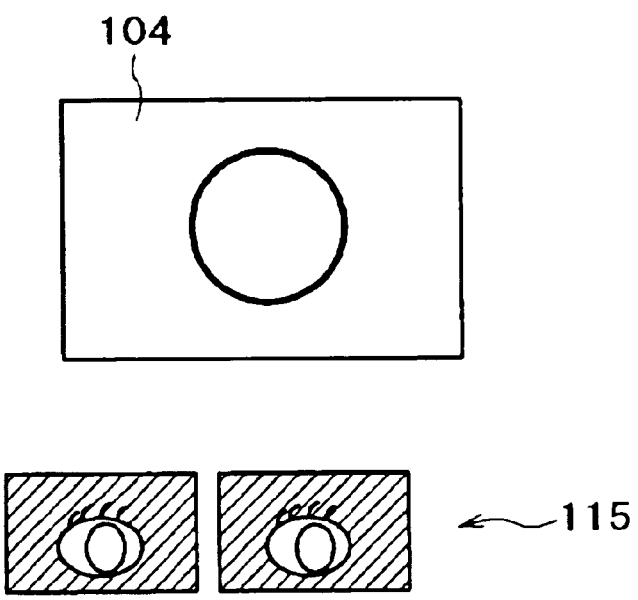
FIG. 23 is a diagram showing the other example of the adjustment pattern to be displayed at the time of adjustment of the stereoscopic image display apparatus according to the first embodiment of the present invention, and is a diagram showing a state of a screen as viewed by a user after proper adjustment.

FIG. 22 and FIG. 23 show another example of an adjustment pattern to be displayed on the display apparatus at the time of adjustment. As shown in FIG. 22, the pattern displayed on the display apparatus such as an adjustment pattern 103 has a character of a black circle and a character of a black cross superimposed on each other, and has a red background 101 of the circle character and a green background 103 of the cross character displayed alternately for each line. The red background 101 of the black circle is an image for a right eye, and the green background 102 of the black cross is an image for a left eye.

If the adjustment pattern 103 is viewed without polarizing glasses, the adjustment pattern 103 displayed as it is can be viewed. In a case where the divided wave plate filter unit is in the correct position, when wearing polarizing glasses 115 for adjustment having a polarizing filter for the right eye provided for both eyes, both eyes see the red background 104 of the circle character, as shown in FIG. 23. The red background 104 of the black circle character indicates that the divided wave plate filter unit is in the proper position. When the red background 104 of the black circle character is not seen, it is immediately known that the divided wave plate filter unit is in a displaced position. By rectifying such a positional displacement by means of the adjusting knobs 35L, 35R, 90L, and 90R described above, the divided wave plate filter unit can be readily adjusted to the correct position. In particular, this example allows observation by both eyes, and therefore even a user having difficulty in closing one eye can readily adjust the position of the divided wave plate filter unit.

Figure 24:
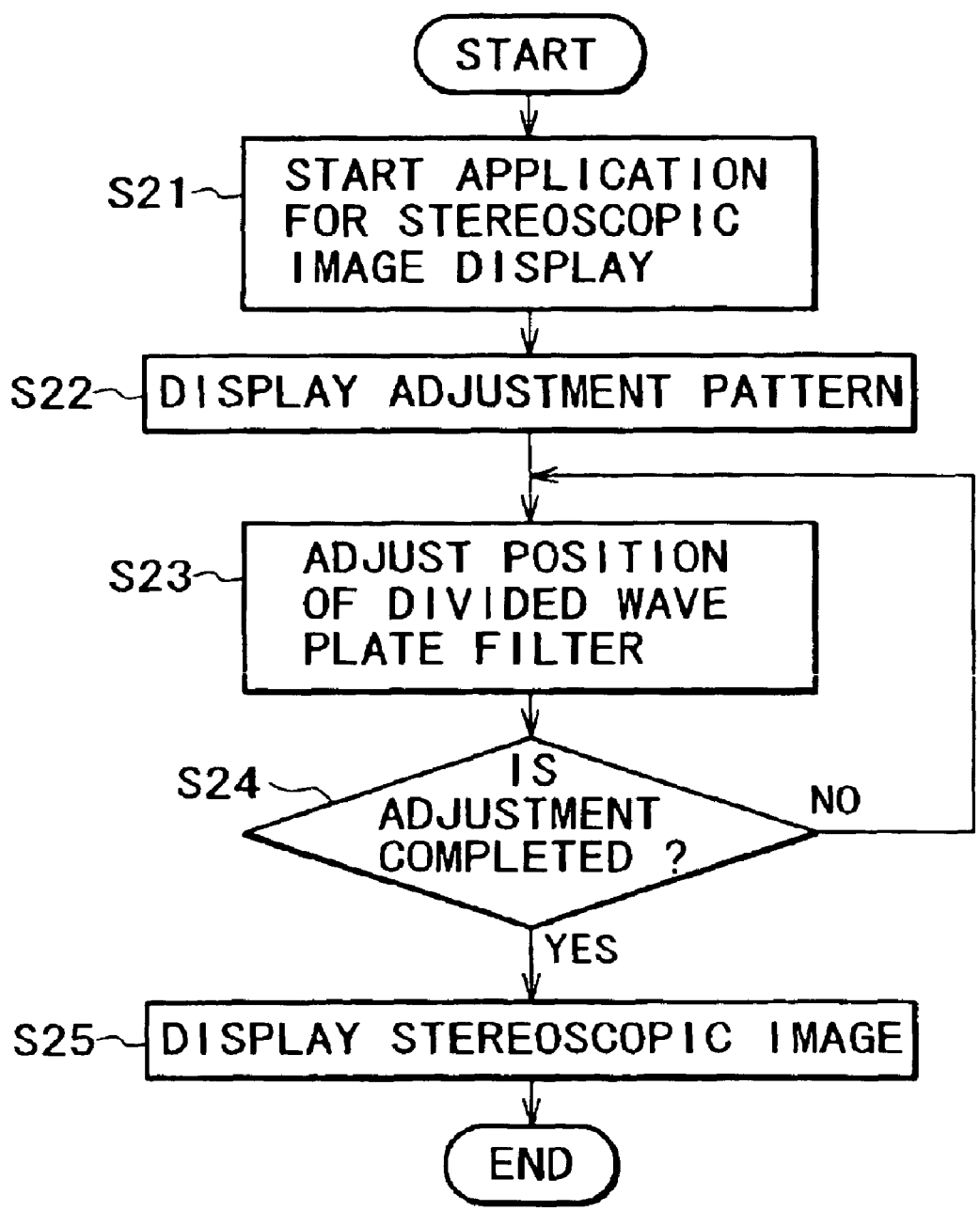
FIG. 24 is a flowchart of assistance in explaining adjustment operation at a start of display of the stereoscopic image display apparatus according to the first embodiment of the present invention.

FIG. 24 is a flowchart of the adjustment. When displaying a stereoscopic image, the notebook computer 11 of FIG. 3 opens an application for stereoscopic image display at a step S21. The adjustment pattern 112 or 103 as shown in FIG. 20 or FIG. 22 is automatically displayed on the screen by the above operation (step S22). The user can proceed with position adjusting operation while looking at the adjustment pattern 112 or 103 through polarizing glasses (step S23). The position adjusting operation is repeated until the adjustment is completed (step S24). When the adjustment is completed, a stereoscopic image is then displayed manually or automatically (step S25), whereby the adjustment is ended.

When the flowchart of the adjustment is used, the adjustment for stereoscopic image display is always made at the time of starting the application for stereoscopic image display. Thus, even a user that makes stereoscopic image display for the first time can be made to start with the adjusting operation.

Figure 25:
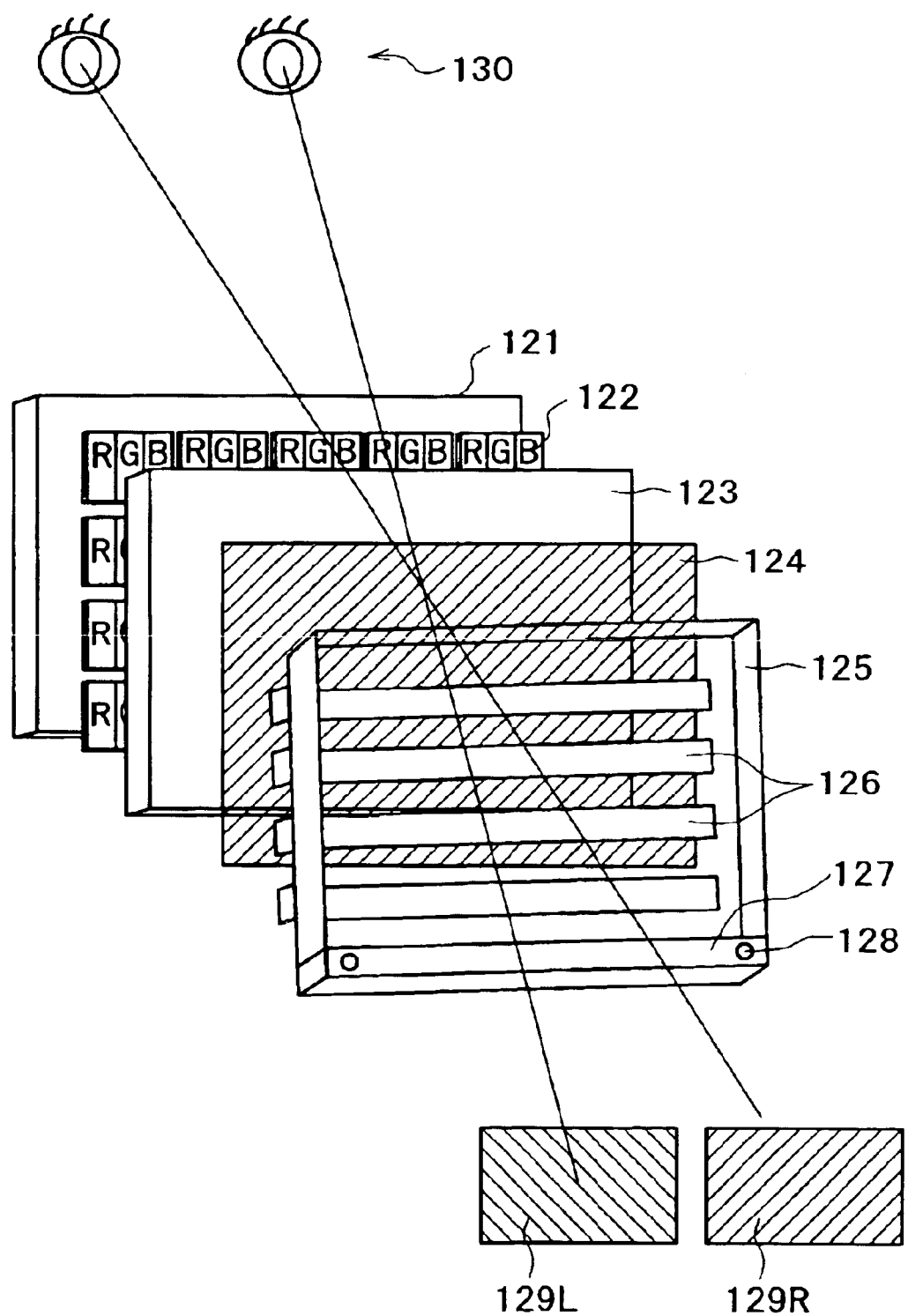
FIG. 25 is a schematic exploded view of another example of the structure of a pixel unit and a divided wave plate filter unit of the stereoscopic image display apparatus according to the first embodiment of the present invention.

FIG. 25 is an example of a stereoscopic image display apparatus with a backlight mechanism. This example eliminates the need for polarizing glasses. In this example, stereoscopic display is made possible by a combination of a source of light in polarization directions perpendicular to each other via polarizing filters 129L and 129R as a backlight mechanism unit, a structure of a liquid crystal panel, and a structure of a divided wave plate filter unit. The liquid crystal panel has a structure in which liquid crystal pixel units 122 are disposed between a pair of transparent supporting substrates 121 and 123. The liquid crystal pixel units 122 have a structure in which pixel portions each formed of three colors are arranged in a matrix manner.

A polarizing plate 124 is disposed on the light source side of the transparent supporting substrate 123. The divided wave plate filter unit has divided wave plates 126 each in a band shape formed on one side of a transparent supporting substrate 125 made of glass or the like and functioning as a frame, or on the liquid crystal panel side in this example. The divided wave plates 126 are each extended such that a longitudinal direction of the divided wave plates 126 is a horizontal direction. The band shape of each of the divided wave plates 126 has a width substantially equal to a pixel pitch of the liquid crystal pixel units 122 mentioned above. A number of divided wave plates 126 is half a number of pixels in a vertical direction of the liquid crystal pixel units 122.

A horizontal holding member 127 similar to the above-mentioned horizontal holding member 15 is attached to a bottom portion of the transparent supporting substrate 125 serving as a frame. Screw holes 128 to which position adjusting means such as a left adjusting knob and a right adjusting knob and the like as later described is attached are formed at a part of both end sides of the horizontal holding member 127.

By using the position adjusting means such as the left adjusting knob and the right adjusting knob and the like attached to the adjusting mechanism, it is possible to reliably adjust the position of the transparent supporting substrate 125 and thus view an optimized stereoscopic image. Incidentally, as shown in FIG. 25, the wave plate filter in this system situated on a backside of the display surface, and therefore it is difficult to physically touch the adjusting mechanism directly at the time of viewing. Accordingly, a method can be used in which viewing is performed after adjustment and readjustment is made as required. Alternatively, the adjusting mechanism may be operated electrically and a unit for operating the adjusting mechanism may be provided on the display surface on the observer side.

A second embodiment of the present invention will next be described with reference to drawings. It is to be noted that while also in the second embodiment, a stereoscopic image display apparatus for displaying image information with parallax will be described mainly, double-screen display is possible by a similar configuration, and a display apparatus of a double-screen display type can be similarly configured.

Figure 26:
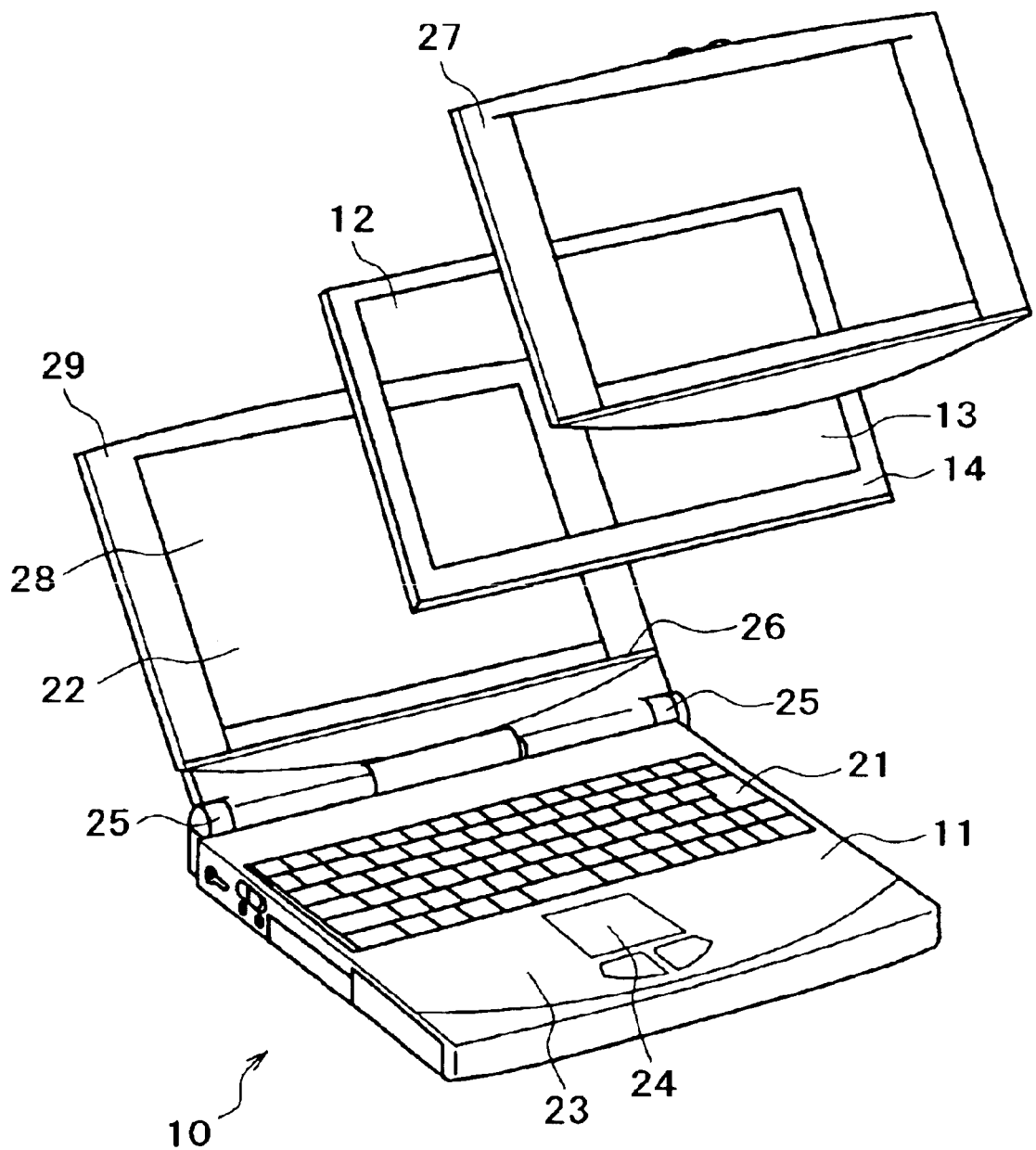
FIG. 26 is a perspective view of a stereoscopic image display apparatus according to a second embodiment of the present invention.

FIG. 26 schematically shows a configuration of a stereoscopic image display apparatus 10 according to the second embodiment of the present invention. The stereoscopic image display apparatus 10 according to the second embodiment includes: a notebook computer 11; a divided wave plate filter 12 as a plate-shaped filter mounted on the notebook computer 11; and a supporting frame 27 disposed on an outside of the divided wave plate filter 12.

The notebook computer 11 includes a liquid crystal panel unit 22 of a folding structure having a liquid crystal display unit 28, which serves as an image display unit. An image including parallax can be displayed from the liquid crystal panel unit 22. As later described, the liquid crystal panel unit 22 itself may be a liquid crystal display panel of a normal notebook computer 11. When an application for displaying a stereoscopic image is not opened, the liquid crystal panel unit 22 can display moving images and still images, for example. The liquid crystal panel unit 22 has a structure in which an image display frame portion 29 is formed integrally around the periphery of the liquid crystal display unit 28 serving as the image display unit. The image display frame portion 29 is a peripheral region formed by extending a transparent substrate in a surface of the liquid crystal panel unit 22, and is a region in which no pixel units are formed. As later described, alignment marks, not shown in FIG. 26, are formed on the image display frame portion 29.

A keyboard unit 21 including keys corresponding to alphanumeric characters, hiragana, and katakana, as well as various control keys is formed on a side of the notebook computer 11 which side is opposed to the liquid crystal panel unit 22. A palm rest unit 23 is provided on a side nearer to a user in a manner continuous with the keyboard unit 21. A pointer pad unit 24 is formed on substantially a central portion of the palm rest unit 23. The keyboard unit 21 and the like are connected to the liquid crystal panel unit 22 via hinge parts 25 and 25, and the liquid crystal panel unit 22 is rotatable on the hinge parts 25 and 25. Thus, a viewer of a stereoscopic image can control an angle of the liquid crystal panel unit 22 with the hinge parts 25 and 25 as a center of rotation. A program for displaying a position adjusting pattern can be stored within a hard disk of the notebook computer 11. The program is read into a CPU and then executed, whereby a position adjusting pattern can be displayed on the liquid crystal panel unit 22.

The liquid crystal panel unit 22 is mounted with the divided wave plate filter 12, and provided on an outside thereof with the peripheral supporting frame 27 of a synthetic resin, for example, for holding the image display unit and the divided wave plate filter 12. The divided wave plate filter 12 is a member that functions as a plate-shaped filter. The divided wave plate filter 12 has a filter unit 13 formed in substantially a central portion of the divided wave plate filter 12, and a filter frame portion 14 formed as an outer frame of the filter unit 13. As later described, the filter unit 13 of the divided wave plate filter 12 is a polarized light control unit provided with a half-wave plate of a band shape for every other horizontal line of pixels. The filter frame portion 14 as the outer frame, in particular, is formed on the periphery of the divided wave plate filter 12. Alignment marks of the divided wave plate filter 12 functioning as the plate-shaped filter which marks correspond to the alignment marks on the image display frame portion 29 are formed on the filter frame portion 14.

Figure 27:
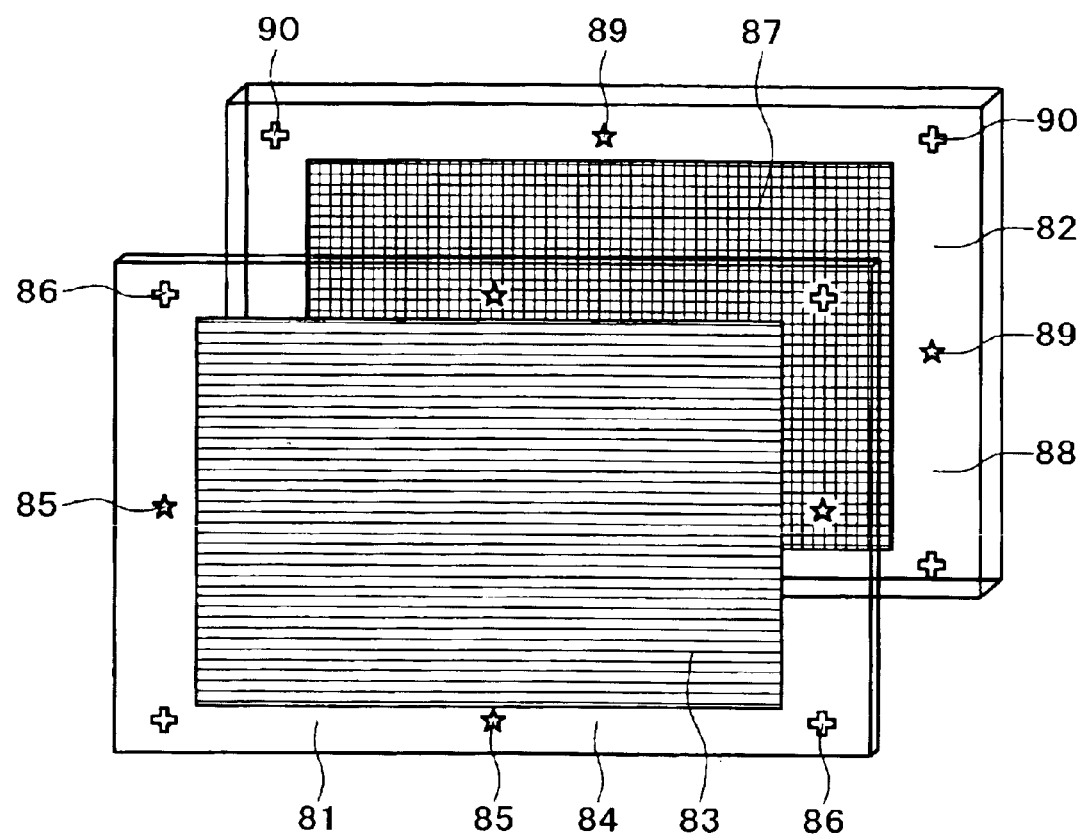
FIG. 27 is an exploded perspective view of a liquid crystal panel unit and a divided wave plate filter of the stereoscopic image display apparatus according to the second embodiment of the present invention.

A structure for high-precision alignment at the time of mounting will be described in the following with reference to FIGS. 27 to 34. FIG. 27 is an exploded perspective view of the image display side of a divided wave plate filter 81 as a plate-shaped filter and a liquid crystal panel unit 82 as a display panel. The divided wave plate filter 81 corresponds to the divided wave plate filter 12 in FIG. 3 and the liquid crystal panel unit 82 corresponds to the liquid crystal panel unit 22 in FIG. 3.

The divided wave plate filter 81 has a structure in which a transparent supporting substrate made of a plate glass in a substantially rectangular shape or the like is formed into a wave plate by microfabrication such as etching or the like. An even-numbered line on pixel lines transmits an image for a right eye or a left eye, and an odd-numbered line conversely transmits an image for the left eye or the right eye. The divided wave plate filter 81 has a filter frame portion 84 as an outer frame. A rectangular region surrounded by the filter frame portion 84 is a filter unit 83 corresponding to a pixel region of the liquid crystal panel unit 82. In the filter unit 83, an even-numbered line is a band-shaped region that gives transmitted light a phase difference of 0, and an odd-numbered line is a band-shaped region that gives transmitted light a phase difference of π (that is, 90 degrees), for example.

The filter frame portion 84 has four alignment marks 85 each formed around a center of a side and four alignment marks 86 each formed at a corner portion. The alignment marks 85 and 86 are marks for accurately positioning the divided wave plate filter 81 and the liquid crystal panel unit 82. The alignment marks 85 have a plane shape of a star, for example. In the second embodiment, in particular, the alignment marks 85 are formed by a wave plate that gives transmitted light a phase difference of π (that is, 90 degrees). The formation of the alignment marks 85 by the wave plate can be made simultaneously with the formation of the band-shaped regions of the filter unit 83. Specifically, etching forms a wave plate on the band-shaped regions of the filter unit 83 by cutting the transparent supporting substrate of glass material or the like. Hence, openings of a mask at the time of the photolithography are formed also in regions corresponding to the alignment marks 85, whereby the alignment marks 85 can be formed by the same etching. The alignment marks 86 have a plane shape of a cross, for example. In the second embodiment, in particular, the alignment marks 86 are formed by a wave plate that gives transmitted light a phase difference of 0, that is, the alignment marks 86 are formed so as to transmit light as it is without changing polarization direction. It is to be noted that the plane shape of the alignment marks 85 and 86 is not specifically limited as long as the shape is easy to detect. Also, the position of the alignment marks 85 and 86 is not limited to the pattern in which a total of eight marks are formed along the periphery; positioning is possible when two marks or more are provided.

The liquid crystal panel unit 82 on which the divided wave plate filter 81 is to be laid has a liquid crystal display unit 87 formed in substantially a central portion of the liquid crystal panel unit 82, the liquid crystal display unit 87 having pixels arranged in a matrix manner and controlled on the basis of a video signal supplied thereto to display required still images and moving images. One of transparent supporting substrates formed so as to sandwich the liquid crystal portion is disposed on a surface side of the liquid crystal panel unit 82. A backside of the divided wave plate filter 81 comes into direct or indirect contact with the one supporting substrate. An image display frame portion 88 continuous with the same one transparent supporting substrate is formed around the periphery of the liquid crystal display unit 87 formed by pixel regions arranged in a matrix manner. The image display frame portion 88 corresponds to the filter frame portion 84 of the divided wave plate filter 81. Four alignment marks 89 and four alignment marks 90 are formed around a center of a side and at a corner portion in correspondence with the alignment marks 85 and 86 of the filter frame portion 84, respectively.

In the second embodiment, the alignment marks 89 and 90 are set in the same plane shapes of a star and a cross as the alignment marks 85 and 86, respectively, of the filter frame portion 84. In order to pass light patterns in the plane shapes of the star and the cross, the alignment marks 89 and 90 are formed by openings in the shape of the star and the cross in a light shielding film, for example. Since the alignment marks 89 and 90 are in the same shapes as the alignment marks 85 and 86, respectively, of the filter frame portion 84, the position of the marks can be readily detected while utilizing detecting means common between the alignment marks 85 and 86 of the filter frame portion 84 and the alignment marks 89 and 90 of the image display frame portion 88 and the same shape recognition program. It is to be noted that the plane shape of the alignment marks 89 and 90 is not specifically limited as long as the shape is easy to detect. Also, the position of the alignment marks 89 and 90 can be set arbitrarily. However, by setting the alignment marks 89 and 90 at positions corresponding to those of the alignment marks 85 and 86 of the filter frame portion 84, it is possible to readily detect the positions by the common detecting means. While the alignment marks 89 and 90 are generally formed on a backside of the transparent substrate on the divided wave plate filter 81 side of the liquid crystal panel unit 82, the alignment marks 89 and 90 may be formed at other parts that can transmit light. Also, a mark for alignment of glass plates used when the pair of glass plates of the liquid crystal panel unit 82 sandwiches the liquid crystal portion can be used as it is.

FIG. 28 are other examples of the shape of alignment marks. FIG. 28A shows a fine cross that allows displacement of an intersection of a horizontal line and a vertical line to be detected. FIG. 28B shows a circular pattern, in which a pattern like a waxing or waning moon appears when there is positional displacement. In FIGS. 28C to 28E, an outer circle is the shape of the alignment marks 89 and 90 of the liquid crystal panel unit 82, and spots shown within the circle are the shape of the alignment marks 85 and 86 of the filter frame portion 84. FIG. 28C shows an example with one inner spot; FIG. 28D shows an example with two inner spots; and FIG. 28E shows an example with three inner spots. These shapes of the alignment marks are shown only as examples, and arbitrary shapes can be selected.

An aligning mechanism at the time of mounting will next be described with reference to FIG. 29. An apparatus of FIG. 29 lays a divided wave plate filter 81 as a plate-shaped filter and a liquid crystal panel unit 82 as a display panel one over the other, and aligns the divided wave plate filter 81 and the liquid crystal panel unit 82 with each other. The apparatus is configured such that the divided wave plate filter 81 is situated under the liquid crystal panel unit 82. Image pickup units 94 such as solid-state image pickup devices are formed at lower ends of arms 93 extending vertically as a pair of image pickup means. Image pickup planes of the image pickup units 94 are opposed to the liquid crystal panel unit 82. The arms 93 are movable in a horizontal direction and a vertical direction. An image signal captured by the image pickup unit 94 is supplied via the arm 93 to a control unit formed by a CPU or the like.

A pair of collimated backlight sources 92 is disposed so as to correspond to the image pickup units 94 on a side opposite from the image pickup units 94 of the part where the divided wave plate filter 81 and the liquid crystal panel unit 82 are laid one over the other, that is, on a bottom side of the apparatus. The collimated backlight sources 92 emit a collimated light beam in an upward direction. The divided wave plate filter 81 is fixed to a filter supporting unit or a movable stage not shown in the figure that can move the divided wave plate filter 81. The liquid crystal panel unit 82 is fixed to a display panel supporting unit not shown in the figure that supports the liquid crystal panel unit 82. An upper side polarizing plate 96 for transmitting light polarized at a required angle is disposed in a space between the image pickup units 94 and the liquid crystal panel unit 82. The polarizing plate 96 is capable of being inserted and retracted in the space between the image pickup units 94 and the liquid crystal panel unit 82. The upper side polarizing plate 96 is used to detect whether light linearly polarized by the alignment marks 85 and 86 of the divided wave plate filter 81 is transmitted. The position where the upper side polarizing plate 96 is inserted or retracted is controlled by the control unit. The upper side polarizing plate 96 is rotatable around an axis not shown in the figure, for example. By controlling the position of the upper side polarizing plate 96 around the axis, movement in insertion or retraction of the lower side polarizing plate 96 is controlled. A lower side polarizing plate 95 is disposed in a space between the collimated backlight source 92 and the divided wave plate filter 81 in a state of being fixed in the space. The lower side polarizing plate 95 converts light from the collimated backlight source 92 into linearly polarized light.

FIG. 30 is a perspective view of main parts of the aligning mechanism at the time of mounting. Light from the collimated backlight source 92 is passed through the lower side polarizing plate 95 and then enters an alignment mark 85 of the divided wave plate filter 81. The position of the collimated backlight source 92 corresponds to the position of the image pickup unit 94 disposed on the upper side in the vertical direction, or a direction of an optical axis. Light passed through the liquid crystal panel unit 82 therefore reaches the image pickup unit 94. The divided wave plate filter 81 is in contact with supporting members 96 and 97 that form part of a filter moving mechanism 102 to be described later. The supporting members 96 and 97 are moved in an X-direction and a Y-direction, respectively, by signals from the control unit to finely adjust the position of the divided wave plate filter 81. Similarly, the liquid crystal panel unit 82 is in contact with a supporting member 98 that forms part of a display panel moving mechanism 101 to be described later. The supporting member 98 is moved by a signal from the control unit to finely adjust the position of the liquid crystal panel unit 82. It is to be noted that the supporting members 96, 97, and 98 for finely adjusting the position of the divided wave plate filter 81 and the liquid crystal panel unit 82 are shown as examples, and therefore the number and the shape of supporting members can be selected arbitrarily as long as the mechanisms can finely adjust the position of the divided wave plate filter 81 and the liquid crystal panel unit 82. For example, a two-axis or three-axis table can be used. In this case, when light needs to be passed through a part, the part for light to pass through may be cut off, or a member such as a glass, a transparent resin material or the like having a function of transmitting light may be used.

Figure 32:
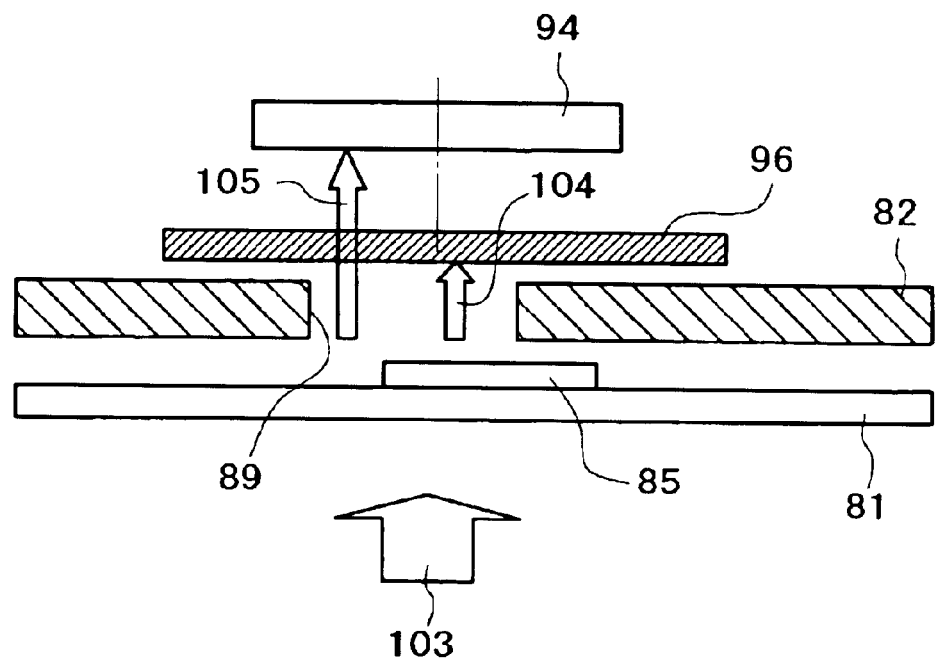
FIG. 32 is a sectional view of assistance in explaining steps in aligning, for mounting, the liquid crystal panel unit and the divided wave plate filter of the display apparatus according to the second embodiment of the present invention, and is a sectional view of assistance in explaining a step of detecting a position of the divided wave plate filter via a wave plate.
Figure 33:
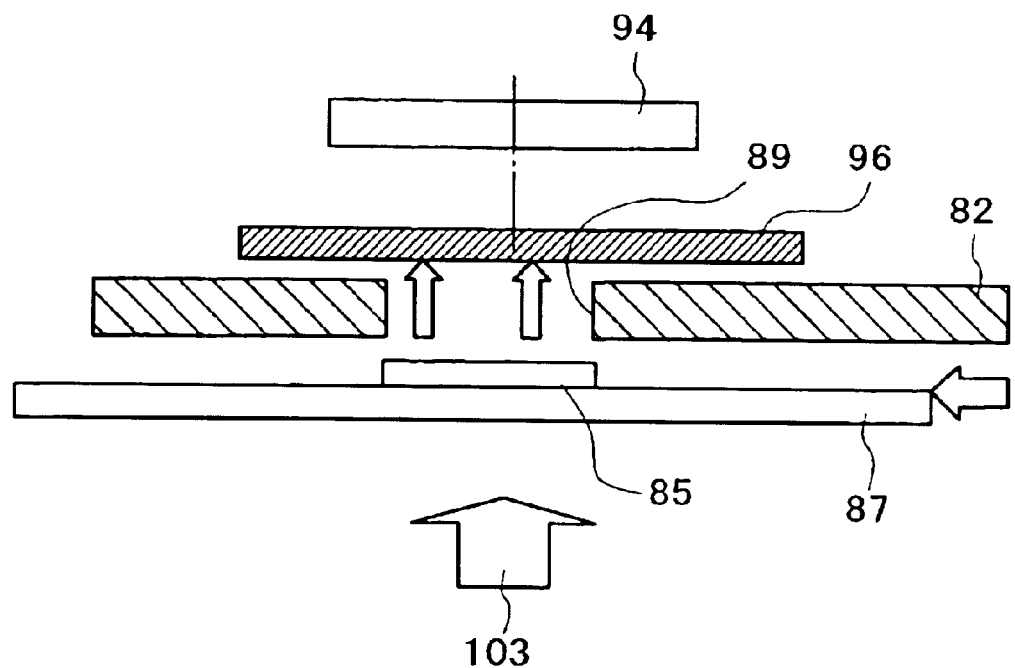
FIG. 33 is a sectional view of assistance in explaining steps in aligning, for mounting, the liquid crystal panel unit and the divided wave plate filter of the display apparatus according to the second embodiment of the present invention, and is a sectional view of assistance in explaining a step of aligning the liquid crystal panel unit and the divided wave plate filter with each other.
Figure 34:
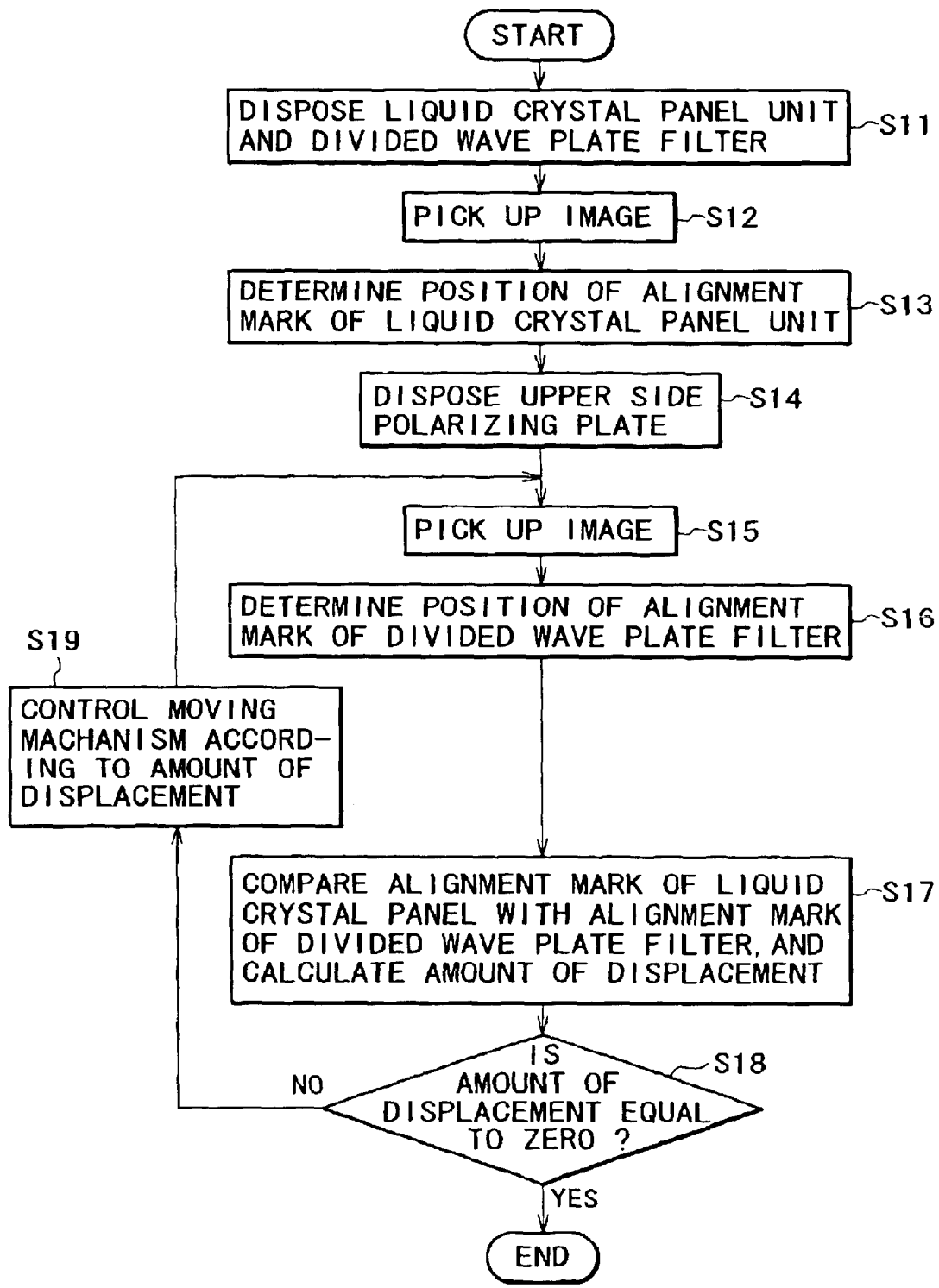
FIG. 34 is a flowchart of assistance in explaining aligning operation in aligning, for mounting, the liquid crystal panel unit and the divided wave plate filter of the display apparatus according to the second embodiment of the present invention.

Such an aligning apparatus can align the divided wave plate filter 81 and the liquid crystal panel unit 82 with each other by steps illustrated in FIGS. 31 to 33. FIG. 34 is a flowchart of the aligning operation. FIG. 34 illustrates proceeding with the aligning operation by steps S11 to S19.

As shown in FIG. 31, in order to align the divided wave plate filter 81 and the liquid crystal panel unit 82 with each other, first the divided wave plate filter 81 is set to the filter moving mechanism 102 and the liquid crystal panel unit 82 is set to the display panel moving mechanism 101 (step S11). At this stage, the liquid crystal panel unit 82 and the divided wave plate filter 81 are laid one over the other, and the upper side polarizing plate-96 operated for rotation by a control unit 100 is controlled to be retracted from an optical path between the image pickup unit 94 and the collimated backlight source 92.

In this state, light is outputted from the collimated backlight source 92. The light from the collimated backlight source 92 is converted by the lower side polarizing plate 95 into uniformly linearly polarized light 103. The linearly polarized light passes through the divided wave plate filter 81 and the liquid crystal panel unit 82, and then reaches the image pickup unit 94. The image pickup unit 94 captures an image of an alignment mark 89 of the liquid crystal panel unit 82 through the transmitted light (step S12), and the image is supplied as an image signal to the control unit 100 (step S13).

The control unit 100 detects the position of the alignment mark 89 of the liquid crystal panel unit 82 on the basis of the signal from the image pickup unit 94. Then, the control unit moves the lower side polarizing plate 96 by rotating operation so that the lower side polarizing plate 96 is laid over the alignment mark 89 of the liquid crystal panel unit 82 as shown in FIG. 32, and picks up an image by the image pickup unit 94 (steps S14 and S15). As described above, an alignment mark 85 of the divided wave plate filter is formed by a wave plate. Hence, light 104 passed through a region of the alignment mark 85 is rotated in polarization direction by 90 degrees. On the other hand, light passed through a region without the wave plate of the alignment mark 85 is not changed in polarization direction. Thus, an image sensed by the image pickup unit 94 through the polarizing plate 96 shows the alignment mark 89 of the liquid crystal panel unit 82 and the alignment mark 85 of the divided wave plate filter 81. When the mark 89 is opaque, for example, the mark 89 is always black (opaque). However, the mark 85 is shown in inverted contrast as a result of rotation of the polarizing plate 96. Thus, the control unit 100 obtains via the image pickup unit 94 information on the position of the liquid crystal panel unit 82 detected in advance as described above by pattern recognition, and simultaneously obtains information on alignment of the alignment mark 85 of the divided wave plate filter 81 by similar recognition of a pattern in a portion where contrast is changed. It is thereby possible to proceed rapidly with the position detection.

At this stage, the positions of the liquid crystal panel unit 82 and the divided wave plate filter 81 are determined from a result of the detection of the image pickup unit 94 (step S16). On the basis of information on the positions, the positions of the liquid crystal panel unit 82 and the divided wave plate filter 81 are compared with each other, and an amount of displacement is obtained from a result of the comparison (step S17). When the amount of displacement becomes zero, it means that the aligning operation is completed, and thus the processing is ended. When the amount of displacement is not zero, the display panel moving mechanism 101 or the filter moving mechanism 102 is operated by a signal from the control unit 100 according to the amount of displacement to move the liquid crystal panel unit 82 or the divided wave plate filter 81 to a required position (step S19). After moving the liquid crystal panel unit 82 or the divided wave plate filter 81, the processing returns to the step S15 to repeat the position detection and correction. The amount of displacement is ultimately reduced to zero to end the processing.

In the second embodiment, the alignment mark 89 of the liquid crystal panel unit 82 and the alignment mark 85 of the divided wave plate filter 81 can be detected substantially simultaneously, and therefore rapid processing is possible when the relative positions are to be obtained. In addition, the image pickup unit 94 can be shared to detect the positions, and a program for recognizing an alignment mark can be shared by using the same alignment shape. Taking advantage of the fact that the alignment mark 85 is of a structure including a wave plate, the alignment mark 85 of the divided wave plate filter 81 can be readily detected as a pattern where contrast changes, and hence reliable detection of the position of the mark is realized because of a difference of the mark in contrast from the aligning pattern of the liquid crystal panel unit 82. In order to form the alignment mark 85 including a wave plate on the divided wave plate filter 81, it suffices only to change a mask pattern at the time of fabrication of the divided wave plate filter 81 to a form including the alignment marks 85 and the alignment marks 86. This does not increase the number of process steps, and is therefore very useful.

It is to be noted that in the second embodiment, the alignment mark of the liquid crystal panel unit 82 is detected without disposing the upper side polarizing plate 96; however, even with the upper side polarizing plate 96 disposed, in a state in which the light from the collimated backlight source 92 is passed through the alignment mark 85 of the divided wave plate filter 81 as it is without being converted into linearly polarized light by using the polarizing plate 45, the alignment marks 89 and 90 of the liquid crystal panel unit 82 may be detected by inserting the light side polarizing plate 95 and rotating the polarization direction.

Figure 35:
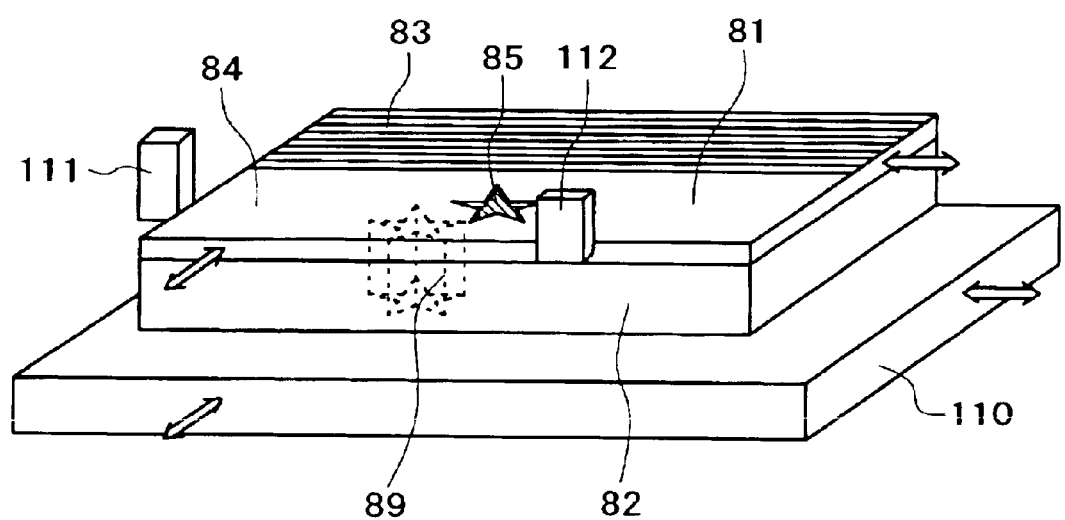
FIG. 35 is a schematic perspective view of another example of an aligning apparatus used at the time of mounting the display apparatus according to the second embodiment of the present invention.

FIG. 35 shows another example of an aligning apparatus. In this example, a liquid crystal panel unit 82 is mounted on an XY stage 110. In this apparatus, a divided wave plate filter 81 is situated on the liquid crystal panel unit 82, and the divided wave plate filter 81 can be controlled to be moved by supporting members 111 and 112. Since light is passed through the XY stage 110, the apparatus uses a structure in which a part for light to pass through is cut off or a structure of a glass, a transparent resin material or the like to transmit light. The divided wave plate filter 81 being situated on the liquid crystal panel unit 82 is a reverse of the above-mentioned positional relation between the liquid crystal panel unit 82 and the divided wave plate filter 81; however, the divided wave plate filter 81 and the liquid crystal panel unit 82 may be disposed in such a reverse manner.

Incidentally, while the filter in the second embodiment forms alignment marks of a structure having a wave plate, the divided wave plates of the filter unit of the divided wave plate filter can be directly used for alignment without position detection being performed by using the alignment marks. In this case, as in the case of the alignment marks, the divided wave plates can be detected by applying polarized light thereto and observing the filter unit via a polarizing plate. Further, the divided wave plates can be detected by measuring thickness of the filter or measuring a distance to the filter unit from a side on which the divided wave plates are disposed.

In addition, while in the foregoing first and second embodiments, liquid crystal display panels that display images by liquid crystal have been described as display panel, the present invention is applicable to other image display apparatus such for example as LED arrays, organic EL displays, plasma displays, cathode-ray tubes, and various other image display apparatus.

Furthermore, while in the foregoing first and second embodiments, apparatus that display right and left images stereoscopically on a single display screen have been described, a display apparatus of a structure having the same divided wave plate filter unit can be applied as it is to a display apparatus for displaying images for two screens or more on a single display screen, and the foregoing aligning apparatus can readily make position adjustment.

Industrial Applicability

As described above, the present invention provides an image separating filter formed by divided wave plates with a position adjusting mechanism. It is thus possible to reliably optimize the installing position of the divided wave plate filter unit, check the position in real time, and make separate displays without causing cross talk. It is thereby possible to observe a stereoscopic image always in the best state at the time of viewing, and enjoy a stereoscopic image without cross talk between the right and left images.

The present invention makes it possible to use a high-definition wave plate filter in an optimum state at all times, and view a stereoscopic image with a high definition and a high degree of realism in an optimum state at all times. Also, in multiple-screen display, it is possible to improve image resolution and enjoy a multiple-screen image without cross talk between a first and a second image. In addition, principles of the stereoscopic image apparatus can be understood through the operation of setting the position of the filter. The present invention can therefore be used for entertaining education, and also provides an advantage of saving trouble of fixing the position of the image separating filter at the time of shipment and the like.

Furthermore, as described above, the stereoscopic image display apparatus according to the present invention can provide an apparatus that enables an image with parallax information to be surely viewed stereoscopically even when a plate-shaped filter such as the divided wave plate filter is attached. The alignment mark of the image display unit and the alignment mark of the plate-shaped filter can be detected substantially simultaneously, and therefore rapid processing is possible when the relative positions are to be obtained.

Furthermore, with the stereoscopic image display apparatus according to the present invention, a thing used in position detecting means can be shared, and also a program for recognizing an alignment mark can be shared by using the same alignment shape. In addition, in detecting alignment marks, an alignment mark including a wave plate can be readily grasped as a dark pattern, and thus reliable detection of mark positions is realized from a difference in contrast. In order to form an alignment mark including a wave plate on the plate-shaped filter, in particular, it suffices only to change a mask pattern at the time of fabrication of the plate-shaped filter. This does not increase the number of process steps, and is therefore very useful.

What is claimed is:

1. A plate-shaped filter characterized by comprising:
   a filter unit used in a state of being laid over an image display unit for displaying image information in a first division and a second division; and
   a filter frame portion disposed integrally around a periphery of the filter unit;
   said filter unit has a first wave plate in a region corresponding to said first division of said image display unit for rotating polarization direction of the image information from said first division to a direction different from polarization direction of the image information from said second division;
   wherein said filter frame portion has a first alignment mark formed by a second wave plate that gives transmitted light a phase difference of 90 degrees and said filter frame portion has a second alignment mark formed by a wave plate that gives transmitted light a phase difference of 0 degrees.

2. A plate-shaped filter as claimed in claim 1, characterized in that:
said first alignment mark is formed at a plurality of positions of said filter frame portion.

3. A plate-shaped filter as claimed in claim 1, characterized in that:
the second wave plate forming said first alignment mark is formed simultaneously with formation of the first wave plate in said filter unit.

4. A plate-shaped filter as claimed in claim 1, characterized in that:
said first division and said second division are formed by an even-numbered line and an odd-numbered line divided in a line form.

5. A plate-shaped filter as claimed in claim 4, characterized in that:
a dividing direction of lines of said filter unit is a horizontal direction or a vertical direction.

6. A plate-shaped filter as claimed in claim 1, characterized in that:
said first alignment mark is for detection of a position thereof relative to an other alignment mark formed in a part of an image display frame portion disposed integrally around a periphery of said image display unit.

7. A display apparatus characterized by comprising:
an image display unit for displaying image information in a first division and a second division;
an image display frame portion disposed integrally around a periphery of said image display unit;
a filter unit used in a state of being laid over said image display unit and having a first wave plate in a region corresponding to said first division of said image display unit for rotating polarization direction of the image information from said first division to a direction different from polarization direction of the image information from said second division; and
a filter frame portion disposed integrally around a periphery of the filter unit;
wherein said filter frame portion has a first alignment mark formed by a second wave plate that gives transmitted light a phase difference of 90 degrees and said filter frame portion has an alignment mark formed by a wave plate that gives transmitted light a phase difference of 0 degrees; and
said image display frame portion has a second alignment mark formed therein in correspondence with said first alignment mark.

8. A display apparatus as claimed in claim 7, characterized in that:
said first alignment mark and said second alignment mark are formed at a plurality of positions of said filter frame portion and said image display frame portion.

9. A display apparatus as claimed in claim 7, characterized in that:
a second wave plate forming said first alignment mark is formed simultaneously with formation of the first wave plate in said filter unit.

* * * * *

UNITED STATES PATENT AND TRADEMARK OFFICE
CERTIFICATE OF CORRECTION

PATENT NO. : 6,961,177 B2
DATED : November 1, 2005
INVENTOR(S) : Seiji Sato and Hidehiko Sekizawa It is certified that error appears in the above-identified patent and that said Letters Patent is hereby corrected as shown below:

<u>Title page,</u>
Item [54], Title, "PLATE-SHARED FILTER" should be -- PLATE-SHAPED FILTER. --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,961,177 B2
DATED : November 1, 2005
INVENTOR(S) : Seiji Sato and Hidehiko Sekizawa It is certified that error appears in the above-identified patent and that said Letters Patent is hereby corrected as shown below:

Title page,
Item [54], Title, "PLATE-SHARED FILTER" should be changed to -- PLATE-SHAPED FILTER --.

Signed and Sealed this

Twenty-first Day of February, 2006

JON W. DUDAS
*Director of the United States Patent and Trademark Office*